(12) United States Patent
Funayama et al.

(10) Patent No.: US 8,081,397 B2
(45) Date of Patent: Dec. 20, 2011

(54) MAGNETIC HEAD ASSEMBLY AND MAGNETIC RECORDING APPARATUS

(75) Inventors: Tomomi Funayama, Tokyo (JP); Kenichiro Yamada, Tokyo (JP); Katsuhiko Koui, Kanagawa-ken (JP); Hitoshi Iwasaki, Kanagawa-ken (JP); Masayuki Takagishi, Tokyo (JP); Masahiro Takashita, Kanagawa-ken (JP); Mariko Shimizu, Kanagawa-ken (JP); Soichi Oikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 299 days.

(21) Appl. No.: 12/457,674

(22) Filed: Jun. 18, 2009

(65) Prior Publication Data

US 2009/0316304 A1   Dec. 24, 2009

(30) Foreign Application Priority Data

Jun. 19, 2008   (JP) .................................. 2008-161024

(51) Int. Cl.
    *G11B 5/127*   (2006.01)
(52) U.S. Cl. ................................... 360/125.08
(58) Field of Classification Search .............. 360/125.08
    See application file for complete search history.

(56) References Cited

U.S. PATENT DOCUMENTS

| | | | |
|---|---|---|---|
| 4,103,315 A | 7/1978 | Hempstead et al. | |
| 4,945,528 A | 7/1990 | Crasemann | |
| 5,695,864 A | 12/1997 | Slonczewski | |
| 5,748,399 A | 5/1998 | Gill | |
| 5,768,066 A | 6/1998 | Akiyama et al. | |
| 5,898,546 A | 4/1999 | Kanai et al. | |
| 5,920,447 A * | 7/1999 | Sakata et al. | 360/121 |
| 6,011,664 A | 1/2000 | Kryder et al. | |
| 6,153,062 A | 11/2000 | Saito | |
| 6,278,576 B1 * | 8/2001 | Ogata et al. | 360/119.07 |
| 6,519,119 B1 * | 2/2003 | van der Heijden et al. | 360/324 |
| 6,580,589 B1 | 6/2003 | Gill | |
| 6,583,969 B1 | 6/2003 | Pinarbasi | |
| 6,621,664 B1 | 9/2003 | Trindade et al. | |
| 6,697,231 B1 * | 2/2004 | Kikuiri | 360/271.5 |
| 6,785,092 B2 | 8/2004 | Covington et al. | |

(Continued)

FOREIGN PATENT DOCUMENTS

JP   64-070947   3/1989

(Continued)

OTHER PUBLICATIONS

Zhu, Jian-Gang et al., "Microwave Assisted Magnetic Recording (MAMR)", Digest of the 18$^{th}$ Magnetic Recording Conference TMRC-2007 B6, p. 37.

(Continued)

*Primary Examiner* — Mark Blouin
(74) *Attorney, Agent, or Firm* — Nixon & Vanderhye, P.C.

(57) ABSTRACT

A magnetic head assembly includes a magnetic recording head, a main magnetic pole, a head slider, a suspension and an actuator arm. The magnetic recording head includes a main magnetic pole having an air bearing surface facing a magnetic recording medium; and a stacked structure having, a first magnetic layer, a second magnetic layer, and an intermediate layer provided between the first magnetic layer and the second magnetic layer. A stacked plane of the stacked structure is inclined with respect to the air bearing surface. The magnetic recording head is mounted on the head slider. The head slider is mounted on one end of the suspension. The actuator arm is connected to the other end of the suspension.

21 Claims, 28 Drawing Sheets

U.S. PATENT DOCUMENTS

| | | | |
|---|---|---|---|
| 6,927,952 | B2 | 8/2005 | Shimizu et al. |
| 6,982,845 | B2 | 1/2006 | Kai et al. |
| 7,106,555 | B2 * | 9/2006 | Kikuiri et al. ............ 360/125.41 |
| 7,119,990 | B2 | 10/2006 | Bajorek et al. |
| 7,145,752 | B2 * | 12/2006 | Ueda et al. ................. 360/235.6 |
| 7,256,955 | B2 | 8/2007 | Pokhil et al. |
| 7,397,633 | B2 | 7/2008 | Xue et al. |
| 7,466,525 | B2 | 12/2008 | Hasegawa et al. |
| 7,471,491 | B2 | 12/2008 | Sato et al. |
| 7,473,478 | B2 | 1/2009 | Sbiaa et al. |
| 7,532,433 | B2 | 5/2009 | Kawato et al. |
| 7,593,185 | B2 | 9/2009 | Yazawa |
| 7,616,412 | B2 | 11/2009 | Zhu et al. |
| 7,724,469 | B2 | 5/2010 | Gao et al. |
| 7,791,829 | B2 | 9/2010 | Takeo et al. |
| 7,911,882 | B2 | 3/2011 | Shimazawa et al. |
| 7,957,098 | B2 | 6/2011 | Yamada et al. |
| 2002/0006013 | A1 | 1/2002 | Sato et al. |
| 2002/0075595 | A1 | 6/2002 | Sato et al. |
| 2003/0026040 | A1 | 2/2003 | Covington et al. |
| 2003/0090844 | A1 | 5/2003 | Shimizu et al. |
| 2004/0150912 | A1 | 8/2004 | Kawato et al. |
| 2004/0228045 | A1 | 11/2004 | Hasegawa et al. |
| 2005/0023938 | A1 | 2/2005 | Sato et al. |
| 2005/0207050 | A1 | 9/2005 | Pokhil |
| 2005/0219771 | A1 | 10/2005 | Sato et al. |
| 2008/0019040 | A1 | 1/2008 | Zhu et al. |
| 2008/0112087 | A1 | 5/2008 | Clinton et al. |
| 2008/0117545 | A1 | 5/2008 | Batra et al. |
| 2008/0137224 | A1 | 6/2008 | Gao et al. |
| 2008/0218891 | A1 | 9/2008 | Gubbins et al. |
| 2008/0268291 | A1 | 10/2008 | Akiyama et al. |
| 2008/0304176 | A1 | 12/2008 | Takagishi et al. |
| 2009/0052095 | A1 | 2/2009 | Yamada et al. |
| 2009/0059417 | A1 | 3/2009 | Takeo et al. |
| 2009/0059418 | A1 | 3/2009 | Takeo et al. |
| 2009/0059423 | A1 | 3/2009 | Yamada et al. |
| 2009/0080105 | A1 | 3/2009 | Takashita et al. |
| 2009/0080106 | A1 | 3/2009 | Shimizu et al. |
| 2009/0080120 | A1 | 3/2009 | Funayama et al. |
| 2009/0088095 | A1 | 4/2009 | Kayano et al. |
| 2009/0097167 | A1 | 4/2009 | Sato et al. |
| 2009/0097169 | A1 | 4/2009 | Sato et al. |
| 2009/0225465 | A1 | 9/2009 | Iwasaki et al. |
| 2009/0257151 | A1 | 10/2009 | Zhang et al. |
| 2009/0262457 | A1 | 10/2009 | Rivkin et al. |
| 2010/0007992 | A1 | 1/2010 | Yamada et al. |
| 2010/0134922 | A1 | 6/2010 | Yamada et al. |

FOREIGN PATENT DOCUMENTS

| | | |
|---|---|---|
| JP | 05-20635 | 1/1993 |
| JP | 07-244801 | 9/1995 |
| JP | 2005-525663 | 8/2005 |
| JP | 2005-285242 | 10/2005 |
| JP | 2006-209964 | 8/2006 |
| JP | 2007-184923 | 7/2007 |
| JP | 2007-193906 | 8/2007 |
| JP | 2008-123669 | 5/2008 |
| KR | 1020030039289 | 5/2003 |

OTHER PUBLICATIONS

Zhu, Xiaochun et al, "Bias-Field-Free Microwave Oscillator Driven by Perpendicularly Polarized Spin Current", IEEE Transactions on Magnetics, vol. 42, No. 10, (Oct. 2006), pp. 2670-2672.
U.S. Appl. No. 12/232,014, filed Sep. 9, 2008.
Akiyama et al., U.S. Appl. No. 12/109,760, filed Apr. 25, 2008.
Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/780,269, filed May 13, 2010.

* cited by examiner

MAGNETIC HEAD ASSEMBLY AND MAGNETIC RECORDING APPARATUS

CROSS-REFERENCE TO RELATED APPLICATIONS

This application is based upon and claims the benefits of priority from the prior Japanese Patent Application No. 2008-161024, filed on Jun. 19, 2008; the entire contents of which are incorporated herein by reference.

BACKGROUND OF THE INVENTION

1. Field of the Invention

This invention relates to a magnetic head assembly and a magnetic recording apparatus.

2. Background Art

In the 1990s, practical application of MR (Magneto-Resistive effect) head and GMR (Giant Magneto-Resistive effect) head has acted as a trigger for recording density and recording capacity of HDD (Hard Disk Drive) to be drastically increased. However, in the 2000s, the problem of thermal fluctuation of the magnetic recording media has been actualized and therefore the speed of the increase of the recording density has temporarily slowed down. Even so, perpendicular magnetic recording, which is fundamentally more advantageous than the longitudinal magnetic recording in high-density recording, has been put into practical use in 2005, and nowadays, the recording density of HDD has been grown by about 40% per year.

Moreover, in the latest recording density verification test, the level of more than 400 Gbits/inch$^2$ has been achieved, and if the recording density steadily develops continuously, it has been anticipated that the recording density of 1 Tbits/inch$^2$ will be realized in about 2012. However, it is thought that realization of such high recording density is not easy even by using the perpendicular magnetic recording scheme because the problem of thermal fluctuation is actualized again.

As a recording scheme that can solve such a problem, "microwave assisted magnetic recording scheme" has been proposed (for example, U.S. Pat. No. 6,011,664). In the microwave assisted magnetic recording scheme, a high-frequency magnetic field in the vicinity of resonant frequency of the magnetic recording medium which is sufficiently higher than recording signal frequency is applied locally to the medium. As a result, the medium resonates and the coercivity (Hc) of the medium of the part to which the high-frequency magnetic field is applied becomes half or less of its original coercivity. By utilizing this effect to superpose the recording magnetic field on high-frequency magnetic field, magnetic recording on the medium with higher coercivity (Hc) and higher magnetic anisotropic energy (Ku) becomes possible. However, in the technique disclosed in U.S. Pat. No. 6,011,664, the high-frequency magnetic field is generated by a coil and therefore it has been difficult to efficiently apply the high-frequency magnetic field to the medium.

Accordingly, as a means for generating the high-frequency magnetic field, techniques for utilizing a spin torque oscillator have been proposed (for example, US Patent Application Publication No. 2005/0023938A1, US Patent Application Publication No. 2005/0219771A1, US Patent Application Publication No. 2008/0019040A1, and IEEE TRANSACTION ON MAGNETICS, VOL. 42, NO. 10, PP. 2670 "Bias-Field-Free Microwave Oscillator Driven by Perpendicularly Polarized Spin Current" by Xiaochun Zhu and lian-Gang Zhu). In the techniques disclosed therein, the spin torque oscillator is composed of a spin injection layer, an intermediate layer, a magnetic layer, and an electrode. When direct current is carried into the spin torque oscillator through the electrode, magnetization of the magnetic layer generates ferromagnetic resonance by spin torque generated by the spin injection layer. As a result, the high-frequency magnetic field is generated from the spin torque oscillator.

The size of the spin torque oscillator is about several tens of nanometers and therefore the generated high-frequency magnetic field is localized in the region of about several ten of nanometers in the vicinity of the spin torque oscillator. Furthermore, by the in-plane component of the high-frequency magnetic field, the perpendicularly magnetized medium can be efficiently resonated and the coercivity of the medium can be drastically lowered. As a result, only in the part in which the recording magnetic field by the main magnetic pole and the high-frequency magnetic field by the spin torque oscillator are superposed, the high-density magnetic recording is performed, and the medium with high coercivity (Hc) and high magnetic anisotropic energy (Ku) can be utilized. Therefore, the problem of thermal fluctuation in the high-density recording can be avoided.

For obtaining a desired effect in the microwave assisted magnetic recording, it is necessary to enhance intensity of the high-frequency magnetic field to be superposed on the recording magnetic field to a certain extent.

For enhancing intensity of high-frequency magnetization, measures of setting Ms·t (Ms is saturation magnetization and t is film thickness) of the magnetic layer used for the spin torque oscillator to be large or measures of shortening the distance between the spin torque oscillator and the recording medium can be thought. However, the former measures are not desirable because the spin torque efficiency falls. Moreover, the latter measures involves technically large difficulty because a floatation amount from the recording medium surface of the head slider on which the magnetic recording head is mounted is currently about 10 nm.

SUMMARY OF THE INVENTION

According to an aspect of the invention, there is provided a magnetic head assembly including: a magnetic recording head including: a main magnetic pole having an air bearing surface facing a magnetic recording medium; and a stacked structure having, a first magnetic layer, a second magnetic layer, and an intermediate layer provided between the first magnetic layer and the second magnetic layer, a stacked plane of the stacked structure being inclined with respect to the air bearing surface; a head slider, the magnetic recording head being mounted on the head slider; a suspension, the head slider being mounted on one end of the suspension; and an actuator arm connected to other end of the suspension.

According to another aspect of the invention, there is provided a magnetic head assembly including: a magnetic recording head including: a main magnetic pole having an air bearing surface facing a magnetic recording medium; and a stacked structure having, a first magnetic layer, a second magnetic layer, and an intermediate layer provided between the first magnetic layer and the second magnetic layer, an orientation axis of the first magnetic layer being inclined with respect to the air bearing surface; a head slider, the magnetic recording head being mounted on the head slider; a suspension, the head slider being mounted on one end of the suspension; and an actuator arm connected to other end of the suspension.

According to another aspect of the invention, there is provided a magnetic recording apparatus including: a magnetic recording medium; a magnetic head assembly including: a magnetic recording head including: a main magnetic pole having an air bearing surface facing a magnetic recording medium; and a stacked structure having a first magnetic layer, a second magnetic layer, and an intermediate layer provided between the first magnetic layer and the second magnetic layer, a stacked plane of the stacked structure being inclined with respect to the air bearing surface; a head slider, the magnetic recording head being mounted; a suspension, the head slider being mounted on one end of the suspension; and an actuator arm connected to the other end of the suspension; and a signal processor configured to write and read of a signal on the magnetic recording medium by using the magnetic recording head mounted on the head assembly.

DETAILED DESCRIPTION OF THE INVENTION

Hereinafter, embodiments of the invention will be described with reference to the drawings.

The drawings are schematic or conceptual. And, relation of thickness and width of each of components, specific coefficient of scales of members, and so forth are not necessarily the same as the actual ones. Moreover, even when the same parts are shown, the scales or specific coefficients are occasionally shown to be different from each other by the drawings.

Moreover, in the specification and each of the drawings, the same signs will be appended to the same components as described with respect to a previously presented figure, and the detailed description thereof will be appropriately omitted.

First Embodiment

Figure 1A:
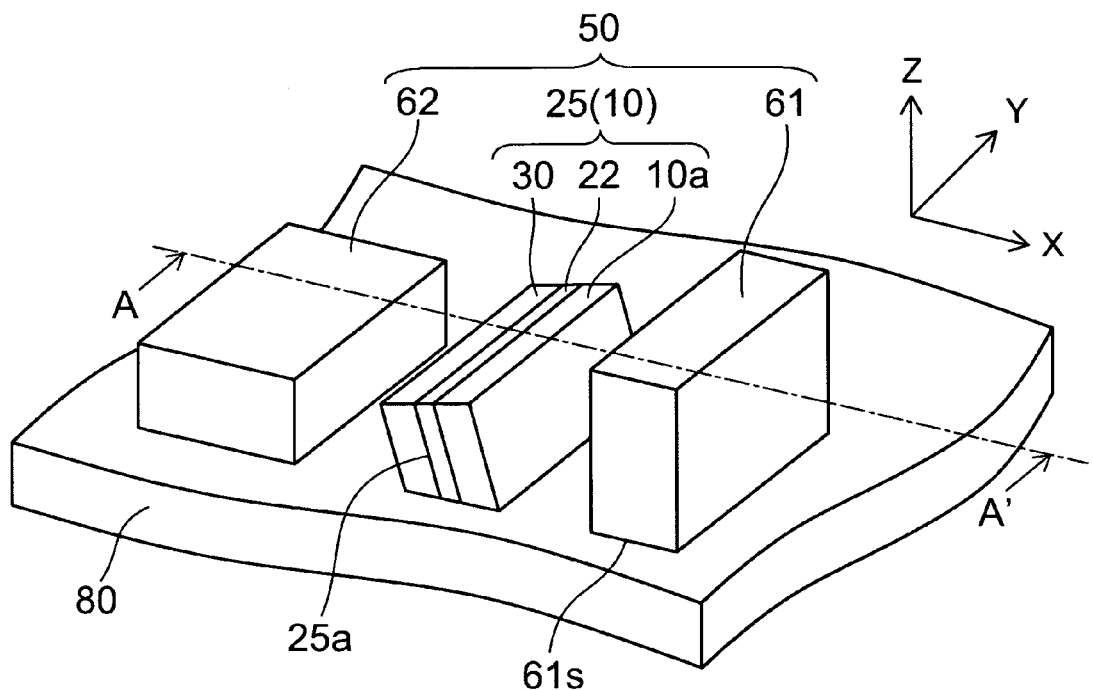
FIGS. 1A and 1B are schematic views illustrating the configuration of magnetic recording head according to a first embodiment of the invention.
Figure 1B:
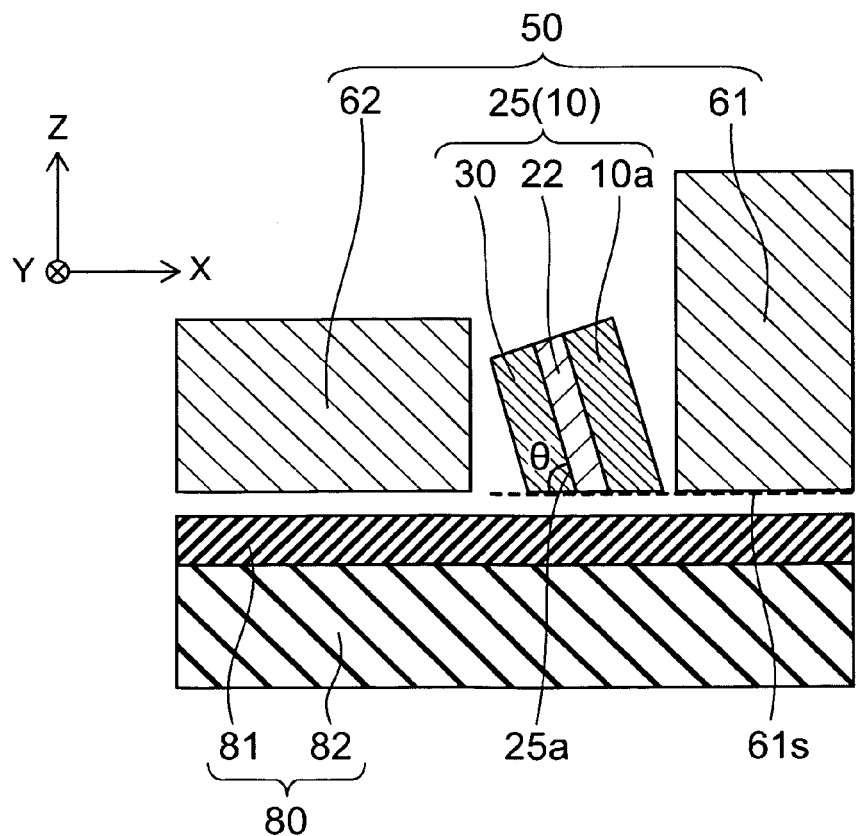

FIGS. 1A and 1B are schematic views illustrating the configuration of magnetic recording head according to a first embodiment of the invention.

Namely, FIG. 1A is a schematic perspective view, and FIG. 1B is a cross-sectional view taken along line A-A' of FIG. 1A.

In the figures, in addition of the magnetic recording head according to the first embodiment of the invention, a magnetic recording medium for performing magnetic recording by a magnetic recording head is also drawn.

As shown in FIGS. 1A and 1B, the magnetic recording head 50 according to the first embodiment of the invention has a main magnetic pole 61 and a stacked structure 25.

The stacked structure 25 has an oscillation layer (first magnetic layer) 10a, a spin injection layer 30 (second magnetic layer), and an intermediate layer 22 provided between the oscillation layer 10a and the spin injection layer 30.

The main magnetic pole 61 has an air bearing surface 61s facing a magnetic recording medium 80.

And, a stacked plane 25a of the stacked structure 25 is inclined with respect to the air bearing surface 61s.

Here, an axis on which the air bearing surface 61s and a plane of the main magnetic pole 61 facing the stacked structure 25 intersect is set to be Y axis. And, the direction orthogonal to Y axis in a plane parallel to the air bearing surface 61s is set to be X axis. And, the direction orthogonal to X axis and Y axis is set to be Z axis. That is, the air bearing surface 61s is a plane parallel to the X-Y plane. The air bearing surface 61s faces the magnetic recording medium 80 with being separate therefrom or being in contact therewith along Z axis direction.

Stacked planes 25a of the stacked structure 25 are the interface between the oscillation layer 10a and the intermediate layer 22 and the interface between the spin injection layer 30 and the intermediate layer 22. However, because the thickness of the intermediate layer 22 is substantially uniform, hereinafter, the description will be performed so that the stacked plane 25a is the interface between the spin injection layer 30 and the intermediate layer 22. If the thickness of the intermediate layer 22 is not uniform, the stacked plane 25a can be a plane passing through the center between the interface between the oscillation layer 10a and the intermediate layer 22 and the interface between the spin injection layer 30 and the intermediate layer 22.

In the magnetic recording head 50 according to this embodiment, the stacked plane 25a of the stacked structure 25 is inclined with respect to the air bearing surface 61s, and in the specific example illustrated in FIG. 1, the stacked plane 25a revolves around Y axis. That is, the stacked plane 25a is inclined so as to revolve around Y axis from the air bearing surface 61s. However, the invention is not limited thereto but as described later, the direction of the inclination of the stacked plane 25a with respect to the air bearing surface 61s can be variously modified.

As shown in FIG. 1B, the angle made by the air bearing surface 61s and the stacked plane 25a is an inclination angle θ. In the magnetic recording head 50 according to this embodiment, the stacked plane 25a is inclined with respect to the air bearing surface 61s, and therefore, the inclination angle θ is larger than 0 degrees and smaller than 90 degrees. That is, the stacked plane 25a is not parallel to the air bearing surface 61s and is not perpendicular thereto.

The magnetic recording head 50 according to this embodiment has a shield 62. The shield 62 is provided on an opposite side to a surface of the stacked structure 25 facing the main magnetic pole 61. The magnetic recording head 50 can have an accessory yoke, a return yoke, and a coil, which are not shown.

The magnetic recording head 50 of this specific example has a so-called shielded structure. The writing magnetic field becomes strong at the end of the main magnetic pole 61 to the shield 62 side. In order that the high-frequency magnetic field for high-frequency magnetic field assist is efficiently applied to this part, the stacked structure 25 is disposed between the main magnetic pole 61 and the shield 62.

At both sides of the stacking direction of the stacked structure 25, one pair of electrodes, which is not shown, are provided and a current can be carried through the stacked structure 25, and thereby, the stacked structure 25 becomes a spin torque oscillator 10.

In this case, at least any one of the main magnetic pole 61 and the shield 62 may also have a function of at least any one of the above one pair of electrodes.

The stacked structure 25 may further include a ground layer, a protective layer, a bias layer, and so forth, which are not shown.

For the spin injection layer 30, a magnetic material having large magnetic anisotropic energy such as CoPt, FePt, and SmCo, a magnetic metal such as Fe, Co, and Ni, or a stacked film of an alloy containing them and a diamagnet such as IrMn and PtMn may be used.

Electrons passing through the spin injection layer 30 or electrons reflected by the interface of the spin injection layer 30 are spin-polarized, and the spin-polarized electrons interact with the magnetization of the oscillation layer 10a. It is desirable that the spin injection layer 30 is a perpendicular magnetization type having a magnetic anisotropy in the perpendicular direction to the film surface.

For the intermediate layer 22, a metal having high conductivity such as Cu, Ag, and Au or a tunnel insulator film such as MgO, AlO$_x$, and TiO$_x$ can be used.

In the oscillation layer 10a, the magnetization induces vibration (oscillation) in operation.

For the oscillation layer 10a, a magnetic metal such as Fe, Co, and Ni, or an alloy containing them may be used. The oscillation layer 10a may be a perpendicular magnetization type having a magnetic anisotropy in the perpendicular direction to the film surface.

When a certain amount or more of current is carried through the spin torque oscillator 10 having the stacked structure 25, magnetization of the oscillation layer 10a causes oscillation by a certain frequency by the effect of the spin-polarized electrons in the spin injection layer 30. The magnetization causing the oscillation in this case produces the high-frequency magnetic field Hac. In this case, a current is carried through a coil, which is not shown, of the magnetic recording head 50 to generate the recording magnetic field Hr from the main magnetic pole 61, and the recording magnetic field Hr and the high-frequency magnetic field Hac are superposed and applied to a magnetic recording layer 81 of a magnetic recording medium 80. In the magnetic recording medium 80, the magnetic recording layer 81 is provided on, for example, a medium substrate 82.

Figure 2A:
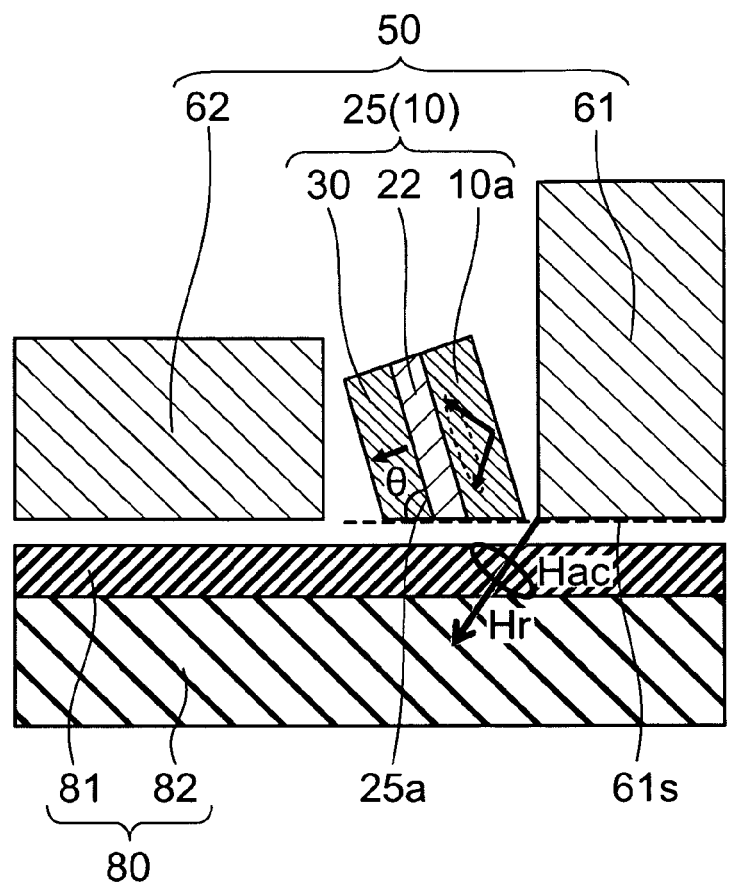
FIGS. 2A and 2B are schematic views illustrating action of the magnetic recording head according to a first embodiment of the invention.
Figure 2B:
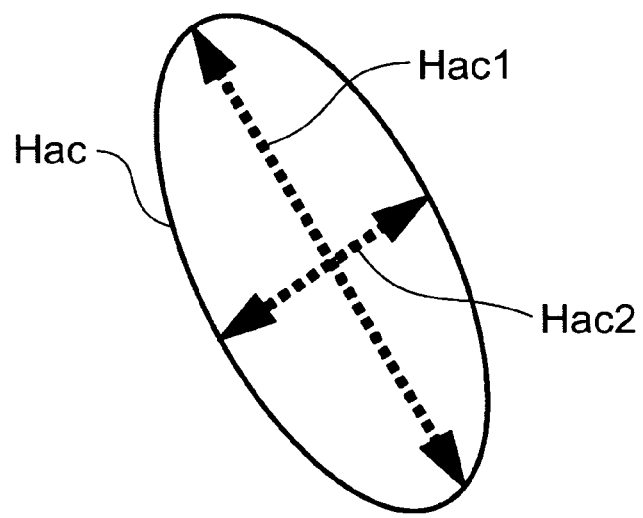

FIGS. 2A and 2B are schematic views illustrating action of the magnetic recording head according to a first embodiment of the invention.

FIG. 2A is a schematic sectional view corresponding to the A-A' line section of FIG. 1A, and the FIG. 2B is a schematic view illustrating a polarization state of the high-frequency magnetic field Hac generated in the magnetic recording head.

As shown in FIG. 2A, in the magnetic recording head 50 according to this embodiment, the stacked plane 25a of the stacked structure 25 is inclined with respect to the air bearing surface 61s and therefore, the high-frequency magnetic field Hac by the spin torque oscillator 10 acts as circularly polarized magnetic field on the magnetic recording layer 81 of the magnetic recording medium 80.

And, as shown in FIG. 2B, the magnitude of high-frequency magnetic field Hac acting effectively for high-frequency assist recording is the sum of magnitudes (lengths) of the component Hac1 of the long axis direction and the component Hac2 of the short axis direction in the circularly polarized magnetic field. Therefore, the magnitude of the high-frequency magnetic field Hac acting effectively for high-frequency assist recording can be set to be large.

Comparative Example

Figure 3A:
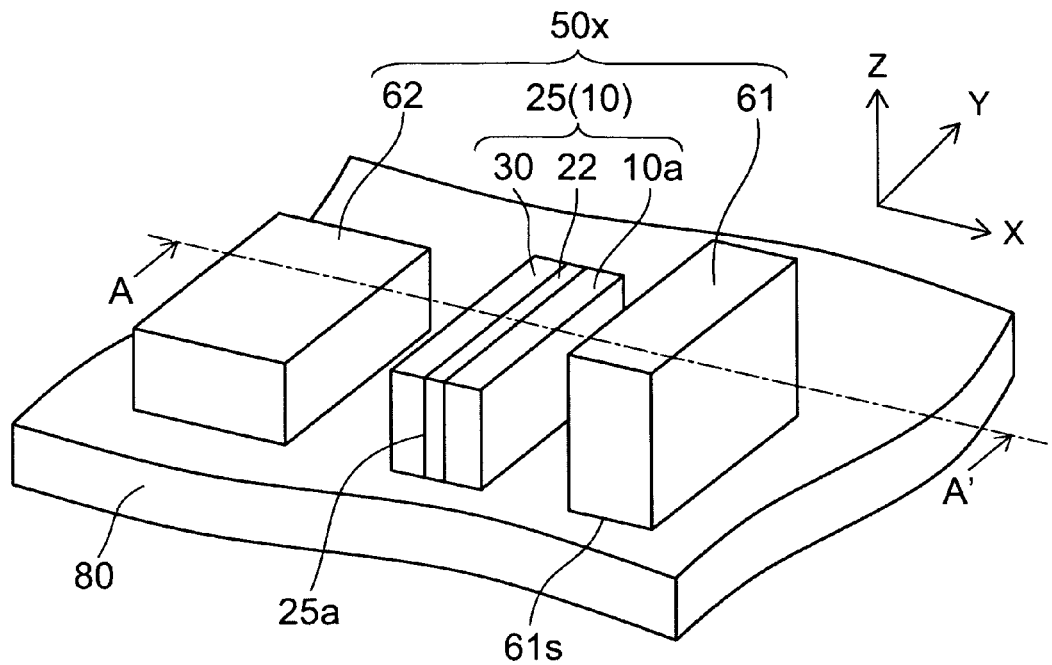
FIGS. 3A and 3B are schematic views illustrating the configuration of a magnetic recording head of comparative example.
Figure 3B:
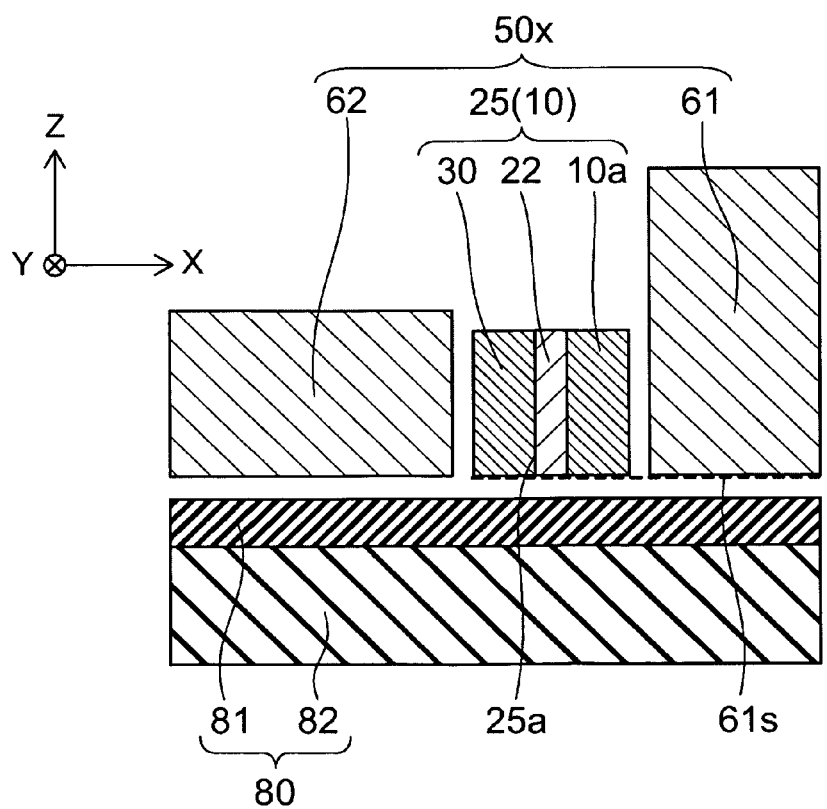

FIGS. 3A and 3B are schematic views illustrating the configuration of a magnetic recording head of a comparative example.

That is, FIG. 3A is a schematic perspective view, and FIG. 3B is a cross-sectional view taken along A-A' of FIG. 3A.

Figure 4A:
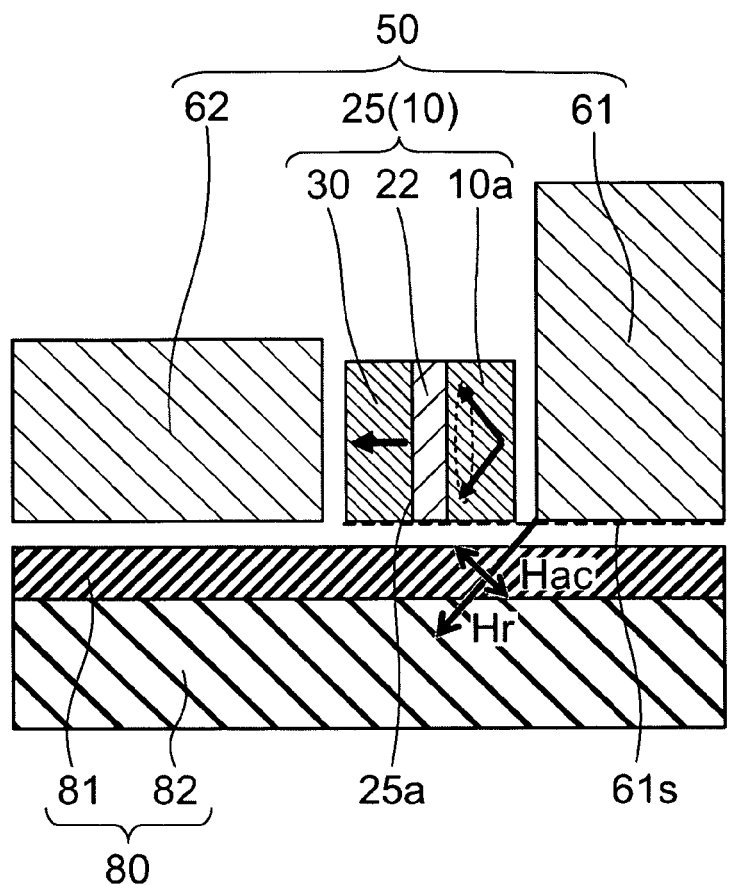
FIGS. 4A and 4B are schematic views illustrating the action of the magnetic recording head of a comparative example.
Figure 4B:
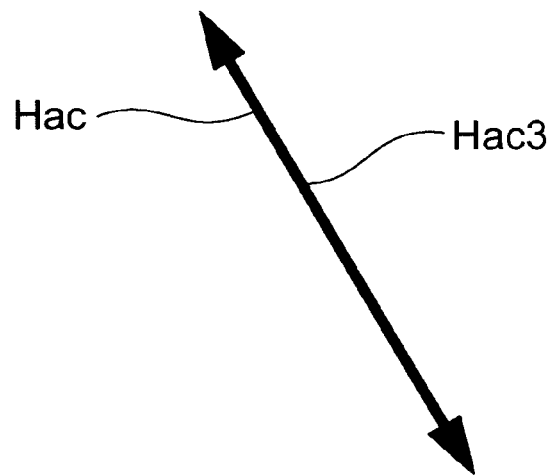

FIGS. 4A and 4B are schematic views illustrating the action of the magnetic recording head of a comparative example.

FIG. 4A is a schematic sectional view corresponding to the A-A' line section of FIG. 3A, and FIG. 4B is a schematic view illustrating a deflection state of the high-frequency magnetic field Hac generated in the magnetic recording head.

As shown in FIGS. 3A and 3B, in the magnetic recording head 50x of the comparative example, the stacked plane 25a of the stacked structure 25 of the spin torque oscillator 10 is not inclined with respect to the air bearing surface 61s of the main magnetic pole 61. That is, the stacked plane 25a is perpendicular to the air bearing surface 61s.

In this case, as shown in FIG. 4A, the high-frequency magnetic field Hac generated by the stacked structure 25 acts as linear polarized magnetic field on the magnetic recording layer 81 of the magnetic recording medium 80.

Therefore, as shown in FIG. 4B, the magnitude of the high-frequency magnetic field Hac acting effectively for high-frequency assist recording is the magnitude (length) of the linear polarized component Hac3. Therefore, the magnitude of the high-frequency magnetic field Hac acting effectively for high-frequency assist recording is small.

That is, the magnitude of the high-frequency magnetic field Hac acting effectively for high-frequency assist recording in the magnetic recording head 50 according to this embodiment can be larger than the magnetic recording head 50x of the comparative example by the amount of the short axis component Hac2 of the circularly polarized magnetic field.

As described above, according to the magnetic recording head 50 according to this embodiment, the intensity of the high-frequency magnetic field applied to the magnetic recording medium can be enhanced, and the magnetic recording head by which high recording density is realized can be provided.

Figure 5:
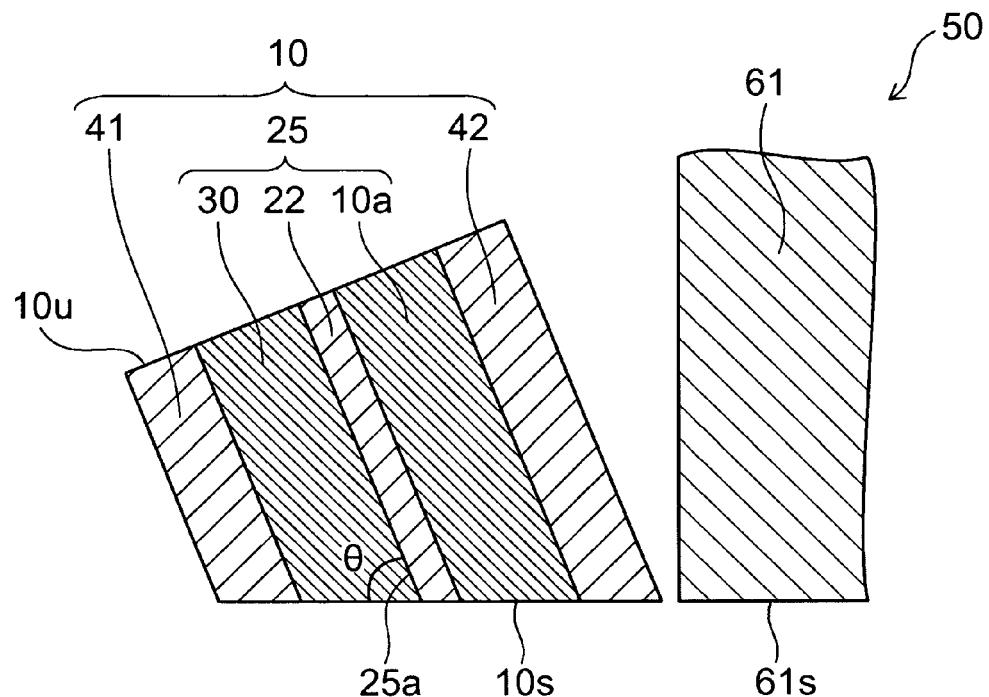
FIG. 5 is a schematic sectional view illustrating the configuration of a relevant part of the magnetic recording head according to the first embodiment of the invention.

FIG. 5 is a schematic sectional view illustrating the configuration of a relevant part of the magnetic recording head according to the first embodiment of the invention.

As shown in FIG. 5, in the magnetic recording head 50 according to the first embodiment of the invention, the spin torque oscillator 10 has the stacked structure 25 and a first electrode 41 and a second electrode 42 disposed at both sides thereof. As described previously, the function of the first and/or second electrodes 41 and/or 42 may be possessed by at least any one of the main magnetic pole 61 and the shield 62, and the first and/or second electrodes 41 and/or 42 can be omitted.

And, the stacked plane 25a of the stacked structure 25 is inclined with respect to the air bearing surface 61s of the main magnetic pole 61, and the angle of the inclination (angle made by the stacked plane 25a and the air bearing surface 61s) is the inclination angle θ.

In this case, if the inclination angle θ is excessively large, the component Hac2 of the short axis direction of the high-frequency magnetic field Hac generated in the spin torque oscillator 10 is small and the efficiency of the circularly polarized magnetic field lowers, and therefore, the effect of improvement of intensity of the high-frequency magnetic field applied to the magnetic recording medium is also small.

On the other hand, if the inclination angle θ is excessively small, the angle made by the magnetic field from the main magnetic pole 61 and the stacked plane 25a of the spin torque oscillator 10 largely departs from the right angle, and the oscillation characteristic becomes unstable.

Figure 6:
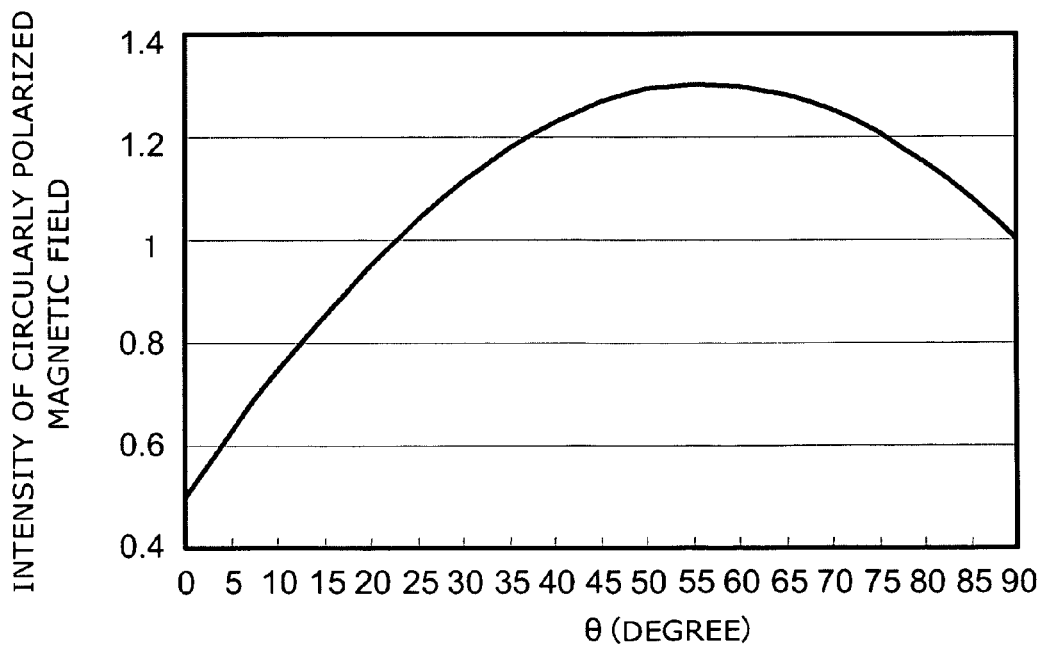
FIG. 6 is a graph illustrating characteristics of the magnetic recording head according to the first embodiment of the invention.

FIG. 6 is a graph illustrating characteristics of the magnetic recording head according to the first embodiment of the invention.

That is, FIG. 6 is a simulation result for the relation of intensity of the circularly polarized magnetic field and the inclination angle θ of the spin torque oscillator 10. And, the horizontal axis represents the inclination angle θ, and the vertical axis represents the intensity of the circularly polarized magnetic field of the spin torque oscillator 10 so that the intensity is 1 when the inclination angle θ is 90 degrees.

As shown in FIG. 6, as the inclination angle θ is decreased from 90 degrees, the intensity of the circularly polarized magnetic field rises, and the rise of about 30% as the maximum can be seen in the vicinity of 55 degrees. As the inclination angle θ is further decreased, the intensity of the circularly polarized magnetic field lowers, and if the inclination angle θ is smaller than 25 degrees, the intensity of the circularly polarized magnetic field is smaller than 1, and the intensity of the circularly polarized magnetic field comes to degrade compared to the case that the inclination angle θ is 90 degrees.

Under the condition that the oscillation by magnetization constantly occurs, the intensity of the circularly polarized magnetic field should rise as the inclination angle θ is from 90 degrees to 0 degrees. On the other hand, as the inclination angle θ decreases from 90 degrees, oscillation by magnetization of the spin torque oscillator 10 gradually becomes unstable by the magnetic field applied from the main magnetic pole 61 of the magnetic recording head to the spin torque oscillator 10, and the intensity of the circularly polarized magnetic field comes to lower. As a result, the intensity of the circularly polarized magnetic field shows behavior illustrated in FIG. 6.

In the magnetic recording head according to this embodiment, in order to improve the writing efficiency on the magnetic recording medium 80, the intensity of the circularly polarized magnetic field generated by the spin torque oscillator 10 is improved by 10% or more, compared to the conventional case that the inclination angle θ is 90 degrees. Therefore, in the magnetic recording head according to this embodiment, it is desirable that the inclination angle θ is 30 degrees or more and 85 degrees or less.

In the magnetic recording head 50 according to this embodiment, the inclination direction of the stacked plane 25a of the stacked structure 25 can be the inclination direction in which the point at which the straight line perpendicular to the air bearing surface 61s intersects the plane containing the stacked plane 25a exists on the side of the magnetic recording medium 80. That is, the inclination direction can be as follows. At the part of the side of the air bearing surface 61s of the stacked structure 25, the stacked plane 25a is near to the main magnetic pole 61, and as the stacked structure 25 is more separate from the side of the air bearing surface 61s, the distance between the stacked plane 25a and the main magnetic pole 61 is more separate. That is, the distance between the stacked plane 25a of the stacked structure 25 and the main magnetic pole 61 can be set to be longer in a part in which the stacked structure 25 is distant from the air bearing surface 61s than in a part in which the stacked structure 25 is near to the air bearing surface 61s.

Thereby, the high-frequency magnetic field Hac generated in the spin torque oscillator 10 (the stacked structure 25) can be made to be near to the recording magnetic field Hr generated in the main magnetic pole 61, and its effect becomes high.

As shown in FIG. 5, in the magnetic recording head 50 according to this embodiment, the lower surface 10*s* of the spin torque oscillator 10, namely, the surface of the side of the air bearing surface 61*s* of the main magnetic pole 61 is on approximately the same plane as the air bearing surface 61*s*. On the other hand, the upper surface 10*u* of the spin torque oscillator 10, namely, the surface opposite to the lower surface 10*s* is unparallel to the lower surface 10*s* and unparallel to the air bearing surface 61*s*. And, in this specific example, the upper surface 10*u* of the spin torque oscillator 10 is perpendicular to the stacked plane 25*a* of the stacked structure 25. However, in the magnetic recording head according to the invention, the angle of upper surface 10*u* of the spin torque oscillator 10 is optional.

Figure 7:
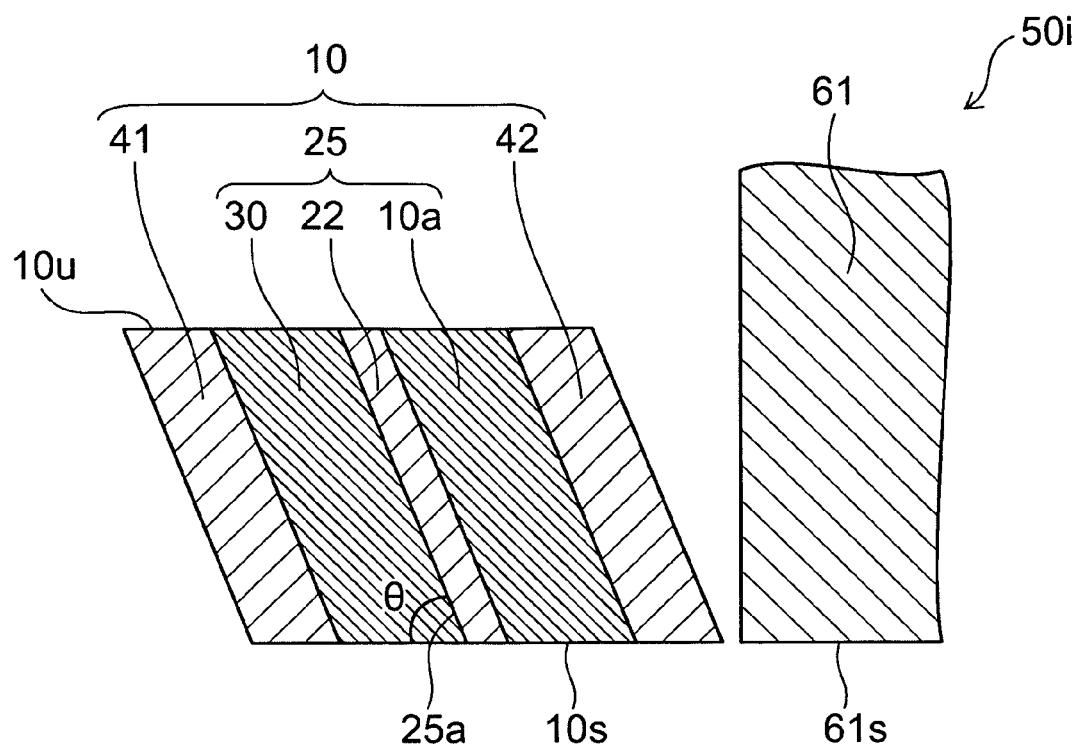
FIG. 7 is a schematic sectional view illustrating the configuration of a relevant part of another magnetic recording head according to the first embodiment of the invention.

FIG. 7 is a schematic sectional view illustrating the configuration of a relevant part of another magnetic recording head according to the first embodiment of the invention.

As shown in FIG. 7, in another magnetic recording head 50*i* according to the first embodiment of the invention, similar to the above magnetic recording head 50, the lower surface 10*s* of the spin torque oscillator 10 is on approximately the same plane as the air bearing surface 61*s*. And the upper surface 10*u* of the spin torque oscillator 10 is in a plane parallel to the air bearing surface 61*s*. That is, the upper surface 10*u* and the lower surface 10*s* of the spin torque oscillator 10 are parallel. In this case, the upper surface 10*u* is inclined with respect to the stacked plane 25*a*.

Also, according to the magnetic recording head 50*i* having such a configuration, the intensity of the high-frequency magnetic field applied to the magnetic recording medium can be enhanced, and the magnetic recording head by which high recording density is realized can be provided.

FIGS. 8A to 11B are schematic sectional views illustrating various modified examples of a relevant part of the magnetic recording head according to the first embodiment of the invention.

Figure 8A:
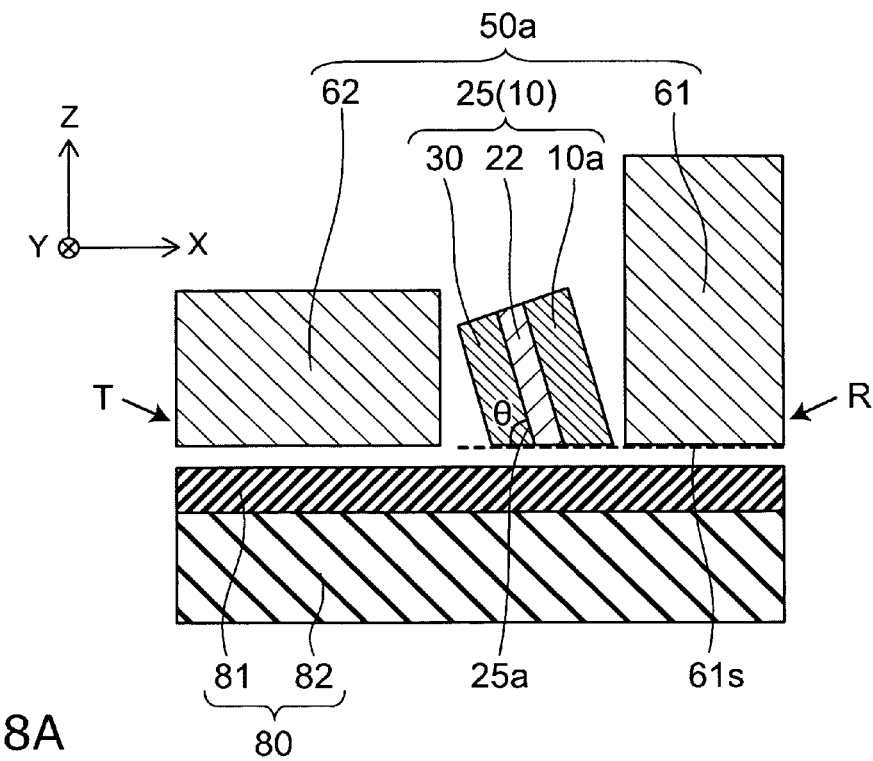
FIGS. 8A to 11B are schematic sectional views illustrating various modified examples of a relevant part of the magnetic recording head according to the first embodiment of the invention.

As shown in FIG. 8A, in one magnetic recording head 50*a* according to this embodiment, the main magnetic pole 61 is disposed on the reading R side, and the shield 62 is disposed on the trailing T side, and the spin torque oscillator 10 is disposed between the main magnetic pole 61 and the shield 62. And, in the spin torque oscillator 10, the oscillation layer 10*a* is disposed on the reading R side, namely, on the side of the main magnetic pole 61, and the spin injection layer 30 is disposed on the trailing T side, namely on the side of the shield 62.

Figure 8B:
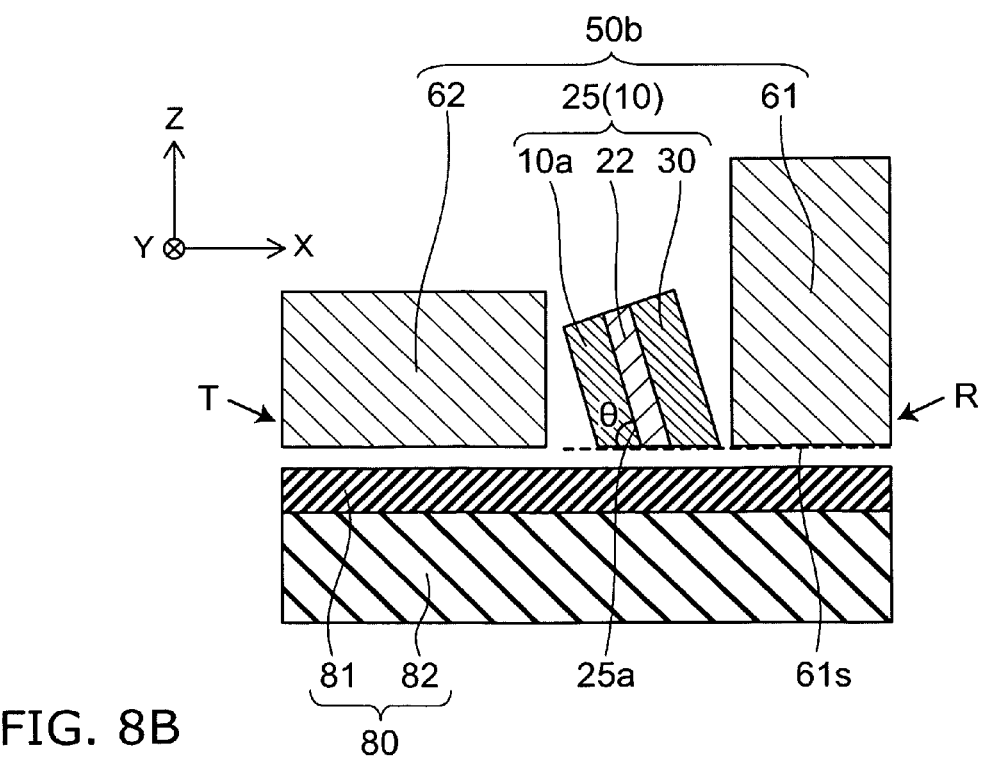

As shown in FIG. 8B, in another magnetic recording head 50*b* according to this embodiment, the main magnetic pole 61 is disposed on the reading R side, and the shield 62 is disposed on the trailing T side, and the spin torque oscillator 10 is disposed between the main magnetic pole 61 and the shield 62. And, in the spin torque oscillator 10, the spin injection layer 30 is disposed on the reading R side, namely, on the side of the main magnetic pole 61, and the oscillation layer 10*a* is disposed on the trailing T side, namely on the side of the shield 62.

Figure 9A:
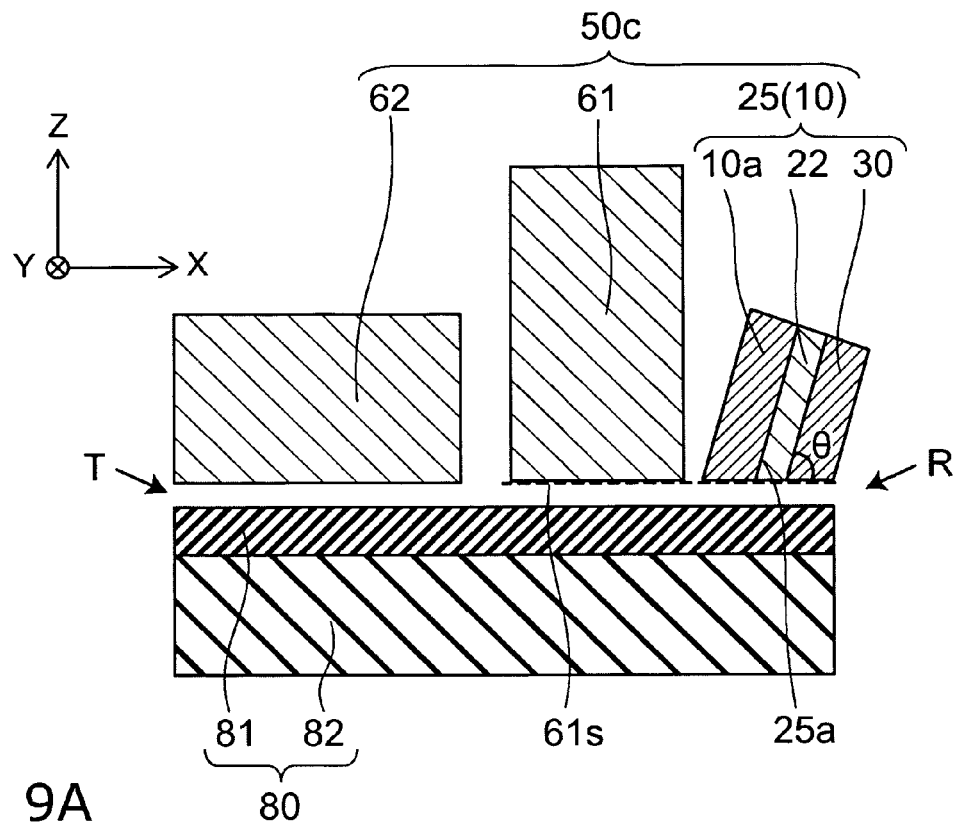

As shown in FIG. 9A, in another magnetic recording head 50*c* according to this embodiment, the spin torque oscillator 10 is disposed on the reading R side, and the shield 62 is disposed on the trailing T side, and the main magnetic pole 61 is disposed between the spin torque oscillator 10 and the shield 62. And, in the spin torque oscillator 10, the oscillation layer 10*a* is disposed on the trailing T side, namely, on the side near to the main magnetic pole 61, and the spin injection layer 30 is disposed on the reading R side, namely, on the side far from the main magnetic pole 61.

Figure 9B:
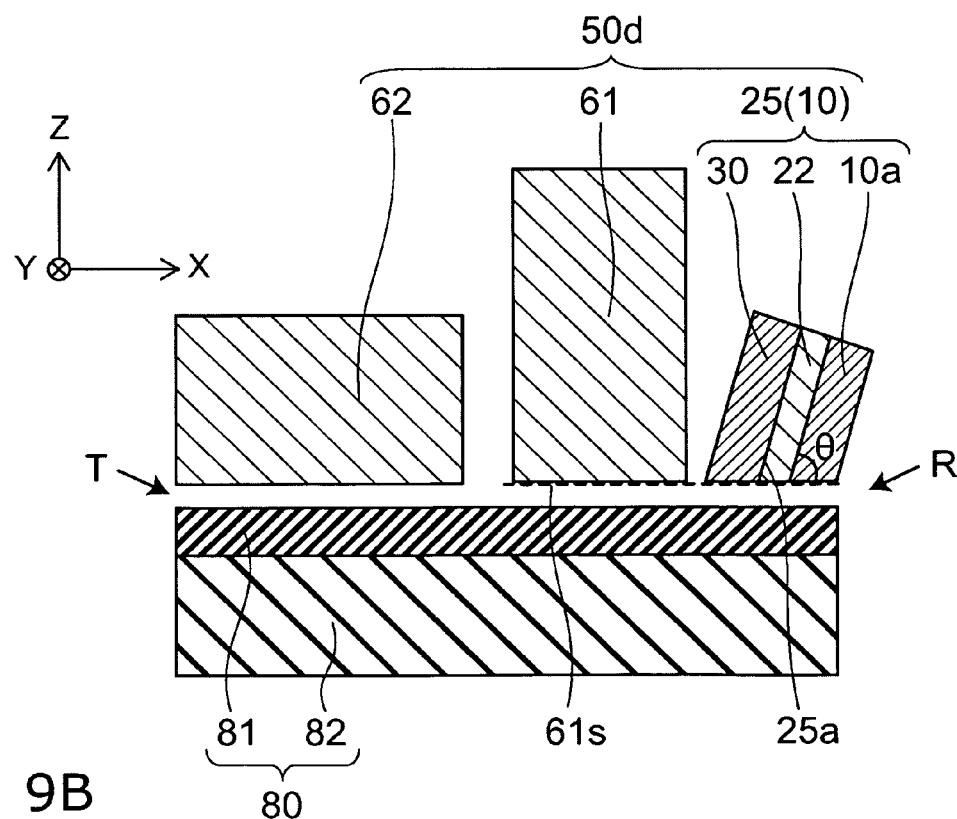

As shown in FIG. 9B, in another magnetic recording head 50*b* according to this embodiment, the spin torque oscillator 10 is disposed on the reading R side, and the shield 62 is disposed on the trailing T side, and the main magnetic pole 61 is disposed between the spin torque oscillator 10 and the shield 62. And, in the spin torque oscillator 10, the spin injection layer 30 is disposed on the trailing T side, namely, on the side near to the main magnetic pole 61, and the oscillation layer 10*a* is disposed on the reading R side, namely, on the side far from the main magnetic pole 61.

Figure 10A:
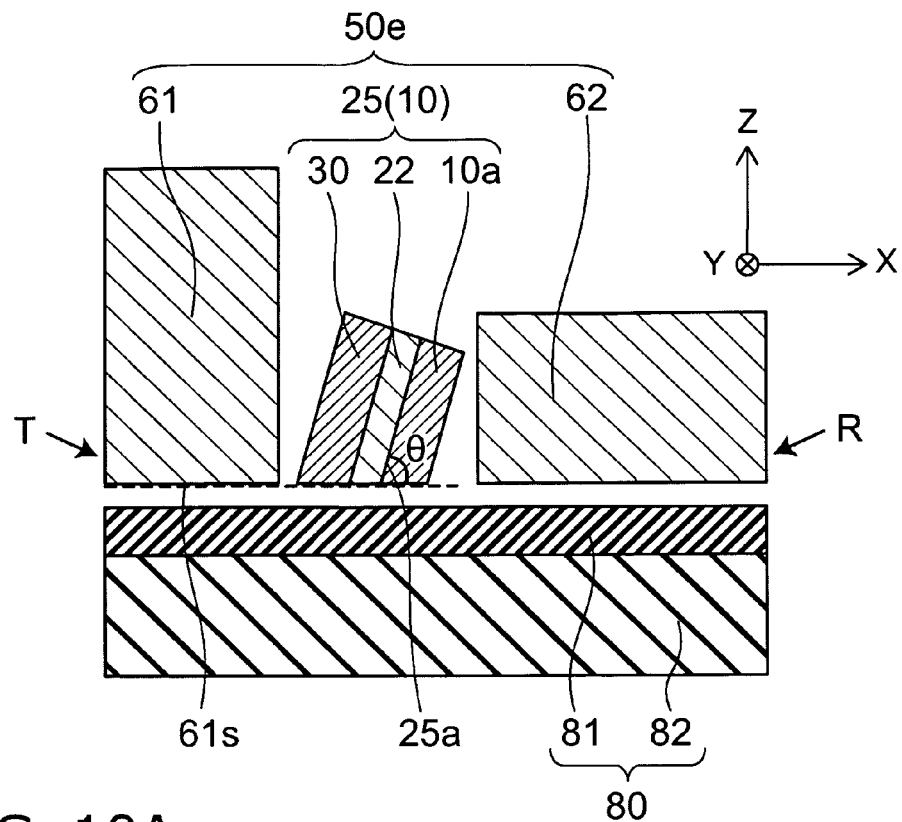

As shown in FIG. 10A, in another magnetic recording head 50*e* according to this embodiment, the shield 62 is disposed on the reading R side, and the main magnetic pole 61 is disposed on the trailing T side, and the spin torque oscillator 10 is disposed between the main magnetic pole 61 and the shield 62. And, in the spin torque oscillator 10, the oscillation layer 10*a* is disposed on the reading R side, namely, on the side of the shield 62, and the spin injection layer 30 is disposed on the trailing T side, namely on the side of the main magnetic pole 61.

Figure 10B:
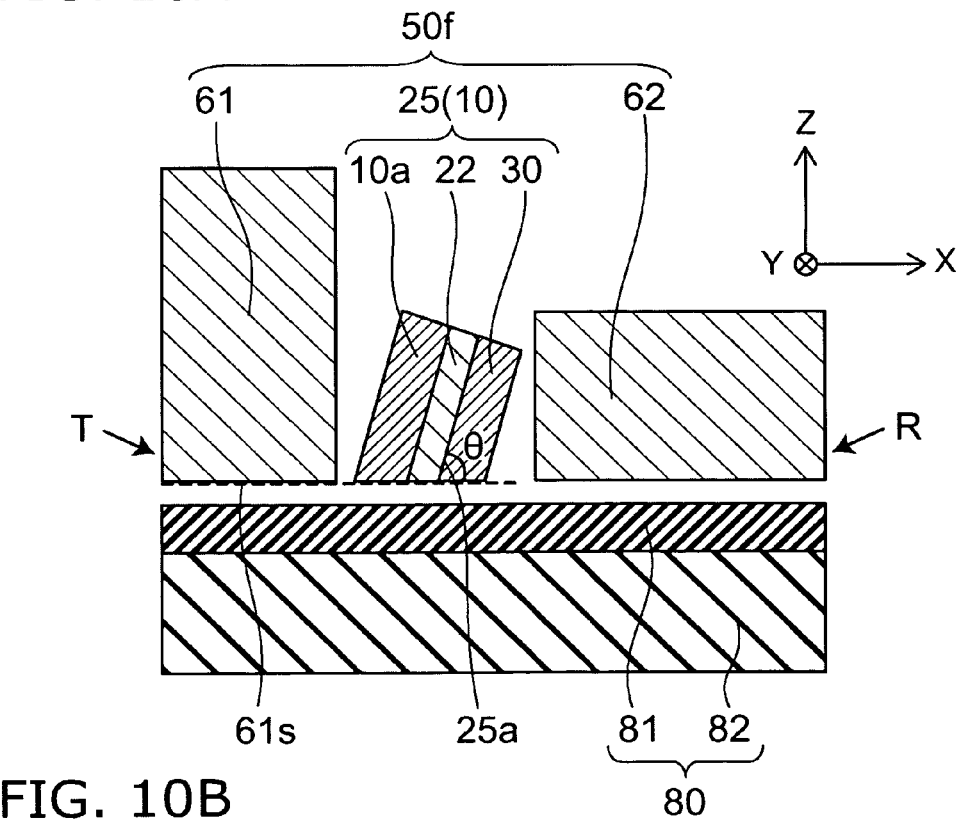

As shown in FIG. 10B, in another magnetic recording head 50*f* according to this embodiment, the shield 62 is disposed on the reading R side, and the main magnetic pole 61 is disposed on the trailing T side, and the spin torque oscillator 10 is disposed between the main magnetic pole 61 and the shield 62. And, in the spin torque oscillator 10, the spin injection layer 30 is disposed on the reading R side, namely, on the side of the shield 62, and the oscillation layer 10*a* is disposed on the trailing T side, namely on the side of the main magnetic pole 61.

Figure 11A:
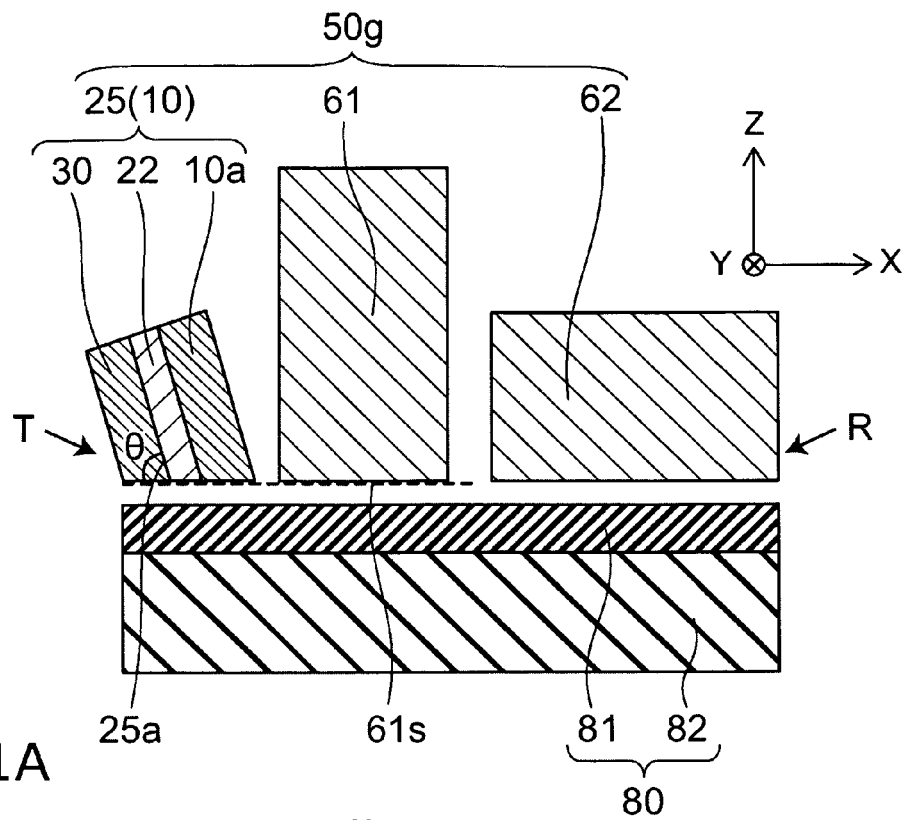

As shown in FIG. 11A, in another magnetic recording head 50*g* according to this embodiment, the shield 62 is disposed on the reading R side, and the spin torque oscillator 10 is disposed on the trailing T side, and the main magnetic pole 61 is disposed between the spin torque oscillator 10 and the shield 62. And, in the spin torque oscillator 10, the oscillation layer 10*a* is disposed on the reading R side, namely, on the side near to the main magnetic pole 61, and the spin injection layer 30 is disposed on the trailing T side, namely, on the side far from the main magnetic pole 61.

Figure 11B:
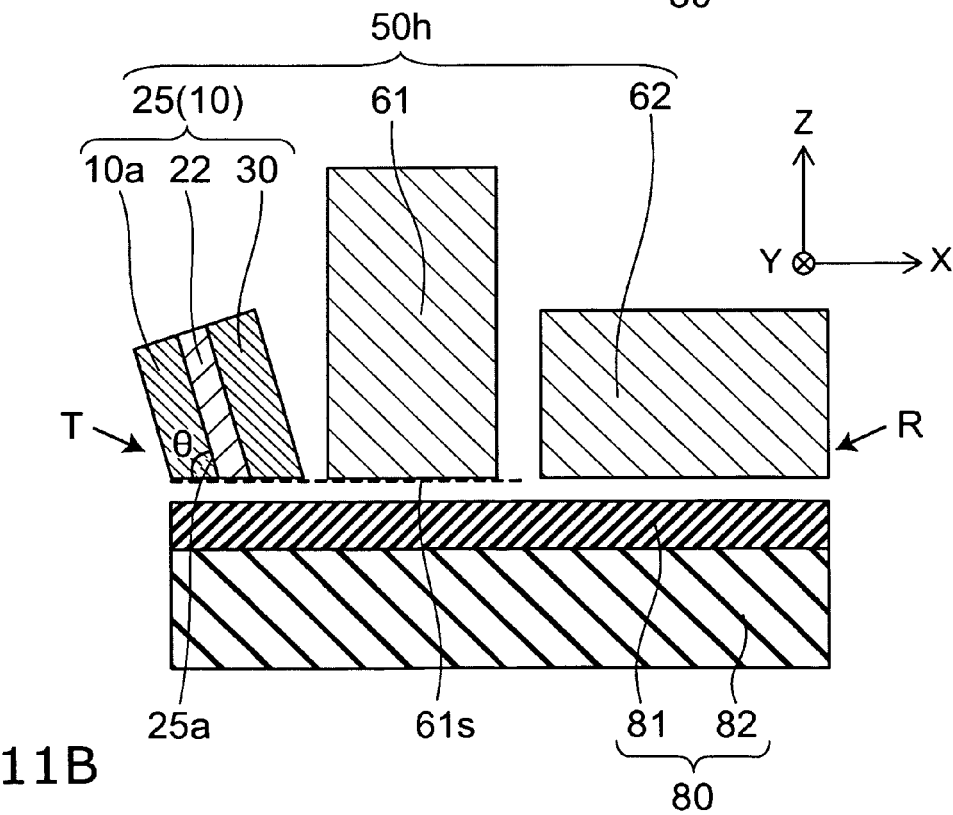

As shown in FIG. 11B, in another magnetic recording head 50*h* according to this embodiment, the shield 62 is disposed on the reading R side, and the spin torque oscillator 10 is disposed on the trailing T side, and the main magnetic pole 61 is disposed between the spin torque oscillator 10 and the shield 62. And, in the spin torque oscillator 10, the spin injection layer 30 is disposed on the reading R side, namely, on the side near to the main magnetic pole 61, and the oscillation layer 10*a* is disposed on the trailing T side, namely, on the side far from the main magnetic pole 61.

As described above, in the magnetic recording head according to this embodiment, the dispositions of the main magnetic pole 61, the spin torque oscillator 10, and the shield 62 are optional. The stacking order of the oscillation layer 10*a*, the intermediate layer 22, and the spin injection layer 30 in the spin torque oscillator 10 is optional.

Also, according to the magnetic recording heads 50*a* to 50*h* having such various configurations, the intensity of the high-frequency magnetic field applied to the magnetic recording medium can be enhanced, and the magnetic recording head by which high recording density is realized can be provided.

In the above-described magnetic recording heads 50*a* to 50*h*, the angle of the upper surface 10*u* of the spin torque oscillator 10 is optional like the magnetic recording head 50*i* described previously in FIG. 7.

Figure 12A:
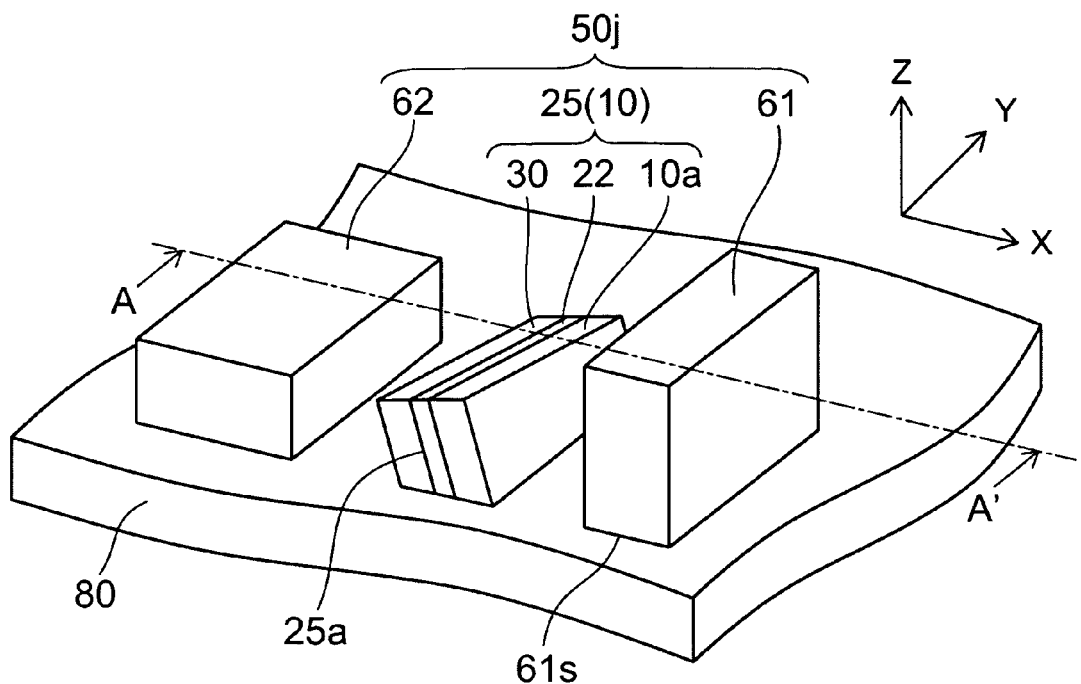
FIGS. 12A and 12B are schematic views illustrating the configuration of another magnetic recording head according to the first embodiment of the invention.
Figure 12B:
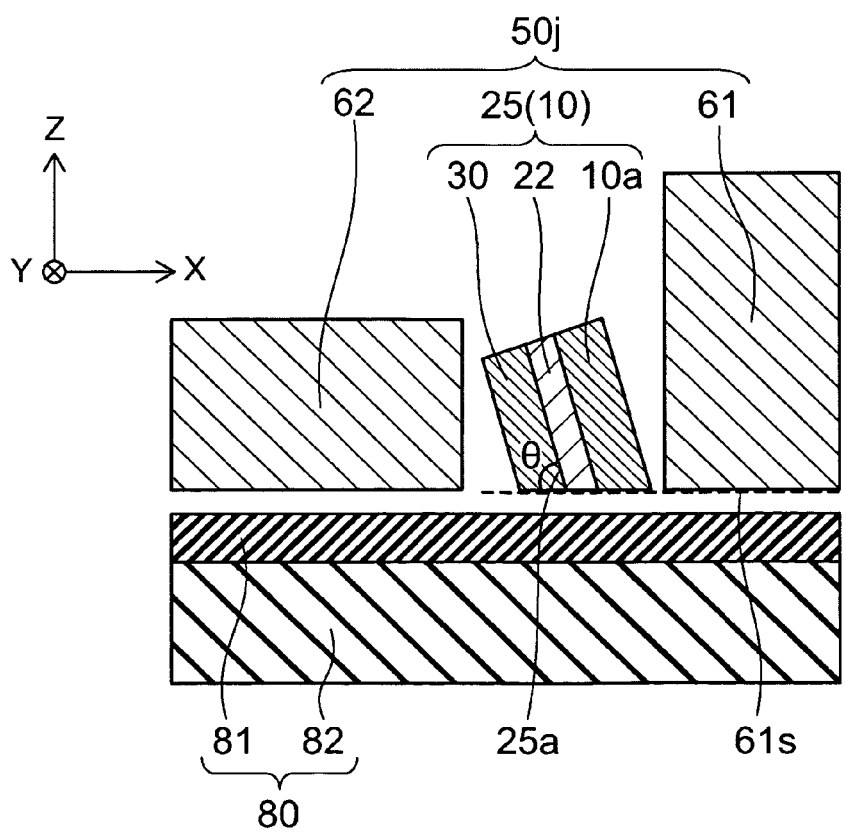

FIGS. 12A and 12B are schematic views illustrating the configuration of another magnetic recording head according to the first embodiment of the invention.

Namely, FIG. 12A is a schematic perspective view, and FIG. 12B is a cross-sectional view taken along line A-A' of FIG. 12A.

As shown in FIGS. 12A and 12B, another magnetic recording head 50j according to the first embodiment of the invention includes the main magnetic pole 61 and the stacked structure 25. The stacked structure 25 has the oscillation layer 10a, the spin injection layer 30, and the intermediate layer 22 provided between the oscillation layer 10a and the spin injection layer 30. The main magnetic pole 61 has the air bearing surface 61s facing the magnetic recording medium 80.

And, the stacked plane 25a of the stacked structure 25 is inclined with respect to the air bearing surface 61s. In this case, in the magnetic recording head 50j of this specific example, the inclination direction of the stacked plane 25a with respect to the air bearing surface 61s is a direction revolving around Y axis and further revolving around X axis.

Also, according to the magnetic recording head 50j having such a configuration, the intensity of the high-frequency magnetic field applied to the magnetic recording medium can be enhanced, and the magnetic recording head by which high recording density is realized can be provided.

For example, the inclination direction of the stacked plane 25a with respect to the air bearing surface 61s may be a direction revolving around Y axis and further revolving around Z axis, and furthermore, may be a direction revolving around Y axis, X axis, and Z axis.

Hereinafter, by using the magnetic recording head 50 illustrated in FIGS. 1A and 1B as an example, a method for manufacturing a magnetic recording head according to this embodiment will be described.

FIGS. 13A to 13D are schematic cross-sectional views by step sequence illustrating the method for manufacturing the magnetic recording head according to the first embodiment of the invention.

Figure 13A:
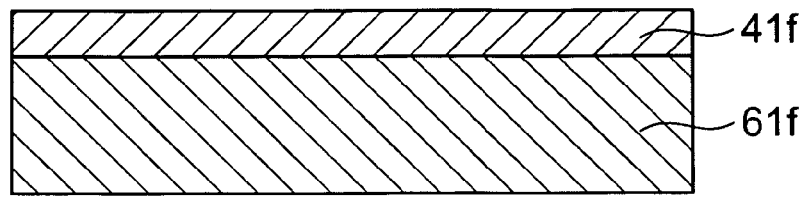
FIGS. 13A to 13D are schematic sectional views by step sequence illustrating the method for manufacturing the magnetic recording head according to the first embodiment of the invention.
Figure 13B:
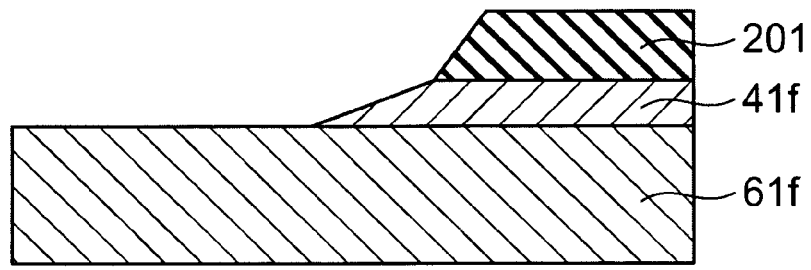
Figure 13C:
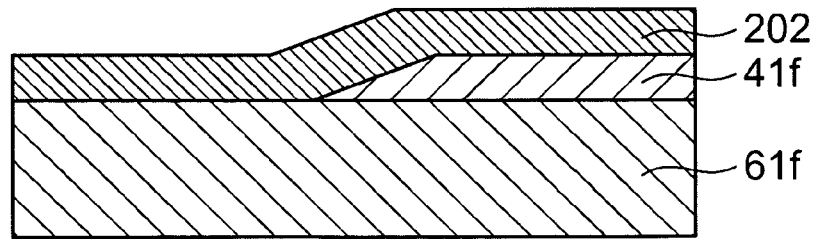
Figure 13D:
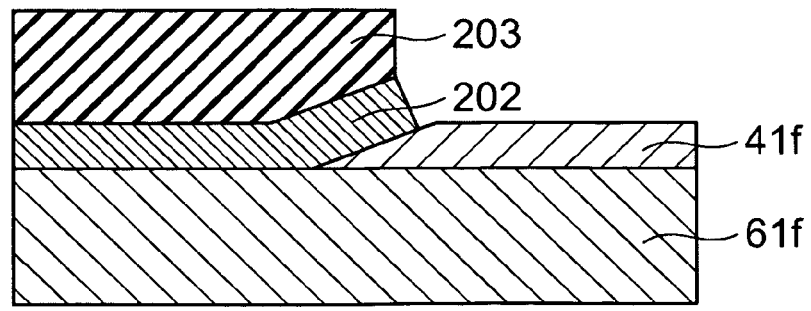

FIG. 13A is a view of the first step, and FIG. 13B is a view following FIG. 13A, and FIG. 13C is a view following FIG. 13B, and FIG. 13D is a view following FIG. 13C.

Figure 14A:
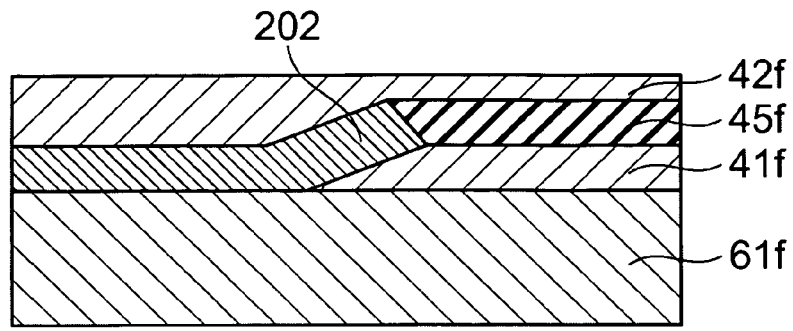
FIGS. 14A to 14C are schematic sectional views by step sequence following FIGS. 13A to 13D.
Figure 14B:
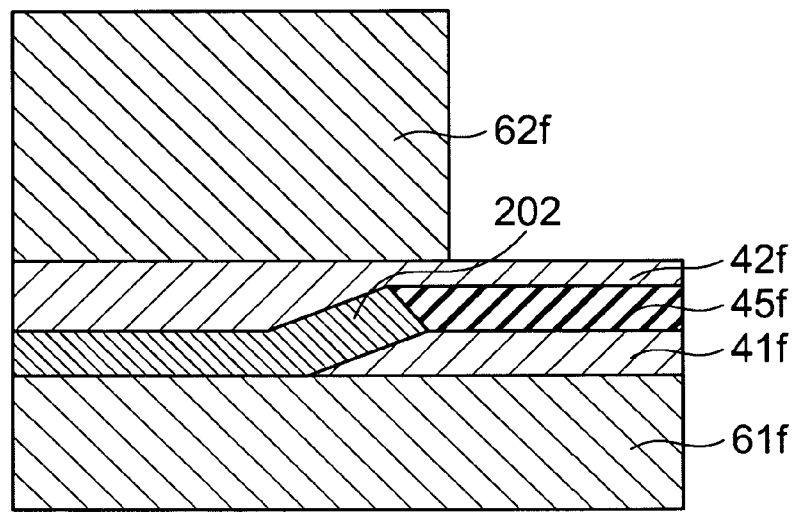
Figure 14C:
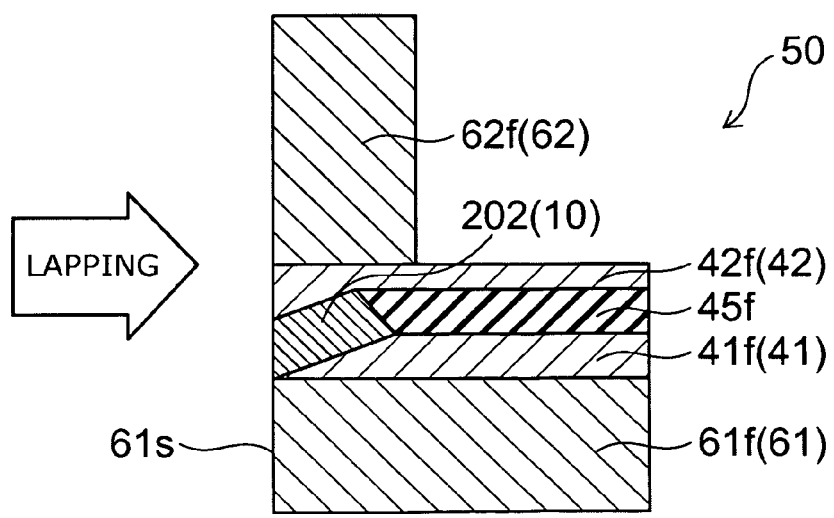

FIGS. 14A to 14C are schematic sectional views by step sequence following FIGS. 13A to 13D.

As shown in FIG. 13A, in the method for manufacturing the magnetic recording head according to this embodiment, first, for example, a FeCo alloy film 61f to be the main magnetic pole 61 and, for example, a Ta film 41f to be the lower electrode (such as the first electrode 41) are film-formed.

Next, as shown in FIG. 13B, on the Ta film 41f, a resist 201 is formed by a photolithography process, and the Ta film 41f is etched by RIE (Reactive Ion Etching). In this case, as shown in FIG. 13B, the etching is performed so that a taper part is formed on the Ta film 41f.

Next, as shown in FIG. 13C, a stacked film 202 to be the spin torque oscillator 10 is film-formed to be along the taper part of the Ta film 41f. For the stacked film 202, for example, a stacked film of a Ta/Ru film to be the ground layer, a CoFe film to be the oscillation layer 10a, a Cu film to be the intermediate layer 22, a CoPt film to be the spin injection layer 30, and a Ta film to be a cap layer can be used.

Next, as shown in FIG. 13D, on the stacked film 202, a resist 203 is formed by a photolithography process, and then the stacked film 202 is patterned by ion milling.

Next, as shown in FIG. 14A, after alumina of the insulator film 45f is film-formed with leaving the resist 203, and the insulator film 45f on the resist 203 is removed by lift-off. Then, for example, a Ta film 42f to be the upper electrode (such as the second electrode 42) is film-formed, and the surface of the Ta film 42f is flattened by CMP (Chemical Mechanical polishing).

Next, as shown in FIG. 14B, for example, a FeCo alloy film 62f to be the shield 62 is film-formed, and a resist is formed by a photolithography process and the FeCo alloy film 62f is patterned by ion milling.

And, as shown in FIG. 14C, then, after finishing such steps as forming a coil (not shown) or a pad (not shown) connected to the lower and upper electrodes or the like, the configuration is cut to be a bar shape, and the cut plane is lapped. In this case, the cut direction is, for example, a plane perpendicular to the film-formation plane of the FeCo alloy 61f to be the main magnetic pole 61.

Thereby, the magnetic recording head 50 illustrated in FIGS. 1A and 1B can be obtained.

In the magnetic recording head 50 obtained as described above, by providing the taper part on, for example, the Ta film 41f to be the lower electrode, the stacked plane 25a of the stacked structure 25 of the spin torque oscillator 10 can be inclined with respect to the air bearing surface 61s of the main magnetic pole 61, and the intensity of the high-frequency magnetic field applied to the magnetic recording medium can be enhanced, and the magnetic recording head by which high recording density is realized can be provided.

Second Embodiment

Figure 15A:
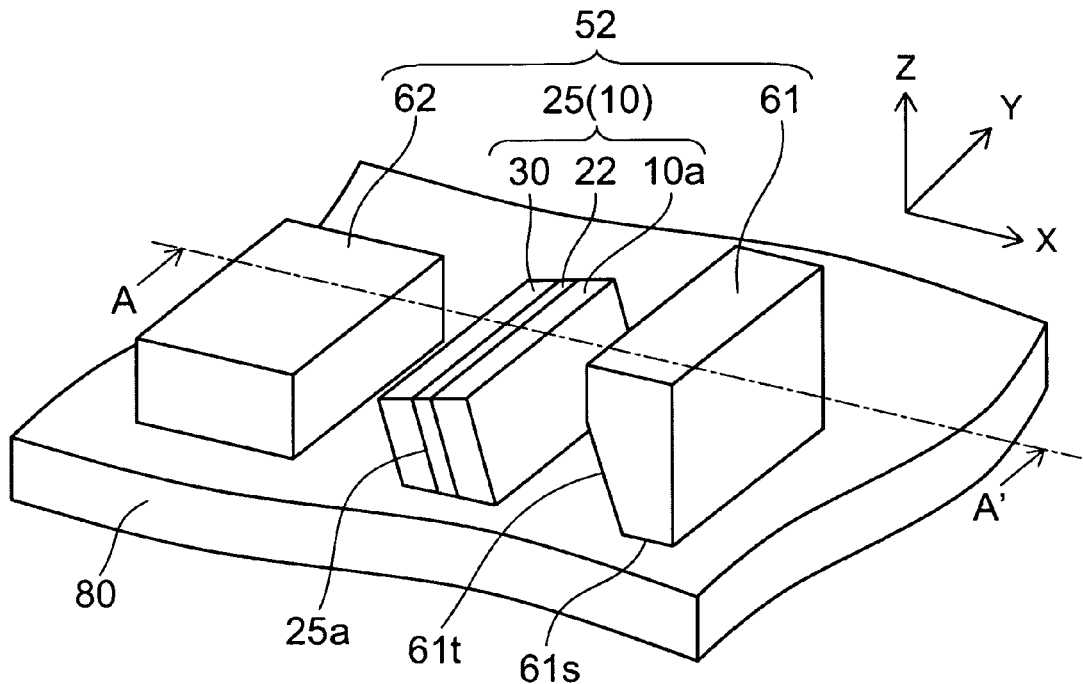
FIGS. 15A and 15B are schematic views illustrating the configuration of the magnetic recording head according to the second embodiment of the invention.
Figure 15B:
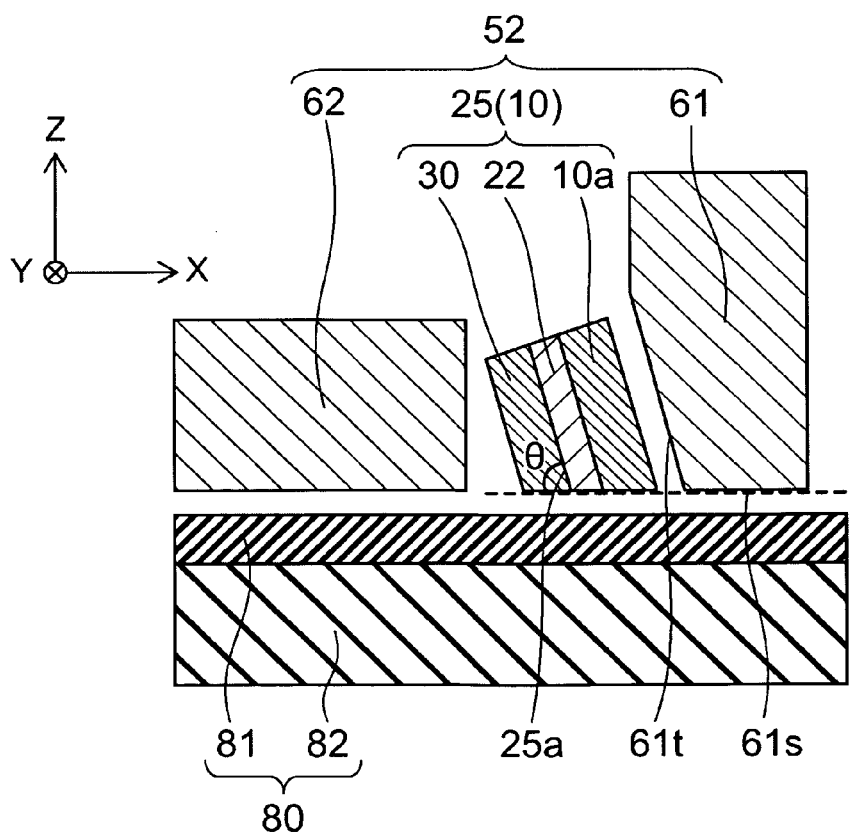

FIGS. 15A and 15B are schematic views illustrating the configuration of the magnetic recording head according to the second embodiment of the invention.

That is, FIG. 15A is a schematic perspective view, and FIG. 15B is a cross-sectional view taken along A-A' of FIG. 15A.

As shown in FIGS. 15A and 15B, in the magnetic recording head 52 according to the second embodiment of the invention, the surface 61t of the main magnetic pole 61 facing the stacked structure 25 is inclined so as to be along the stacked plane 25a of the stacked structure 25.

That is, in the magnetic recording head 52 according to this embodiment, the stacked plane 25a of the stacked structure 25 is inclined with respect to the air bearing surface 61s of the main magnetic pole 61, and furthermore, the surface 61t of the main magnetic pole 61 facing the stacked structure 25 is approximately parallel to the stacked plane 25a of the stacked structure 25.

Other than this, the magnetic recording head 52 can be the same as the magnetic recording head 50 according to the first embodiment, and the description thereof will be omitted.

In the magnetic recording head 52 according to this embodiment, the stacked plane 25a of the spin torque oscillator 10 (stacked structure 25) is inclined from the direction perpendicular to the air bearing surface 61s, and therefore, as described in the first embodiment, the intensity of the high-frequency magnetic field applied to the magnetic recording medium is enhanced, and the effect of the high-frequency magnetic field assist is enhanced.

Furthermore, the surface 61t of the main magnetic pole 61 facing the spin torque oscillator 10 is inclined so as to be along the inclination of the stacked plane 25a of the spin torque oscillator 10.

Thereby, the recording magnetic field generated by the main magnetic pole 61 is applied in the direction that is approximately perpendicular to the layer surface of the spin torque oscillator 10. That is, a bias magnetic field with respect to the spin torque oscillator 10 is applied perpendicularly to the layer planes of the spin injection layer 30 and the oscillation layer 10a, and applied in the magnetization easy-axis direction of the spin injection layer 30 and the oscillation layer 10a having perpendicular magnetic anisotropy. Therefore, in the spin torque oscillator 10, stable oscillation can be obtained.

Figure 16A:
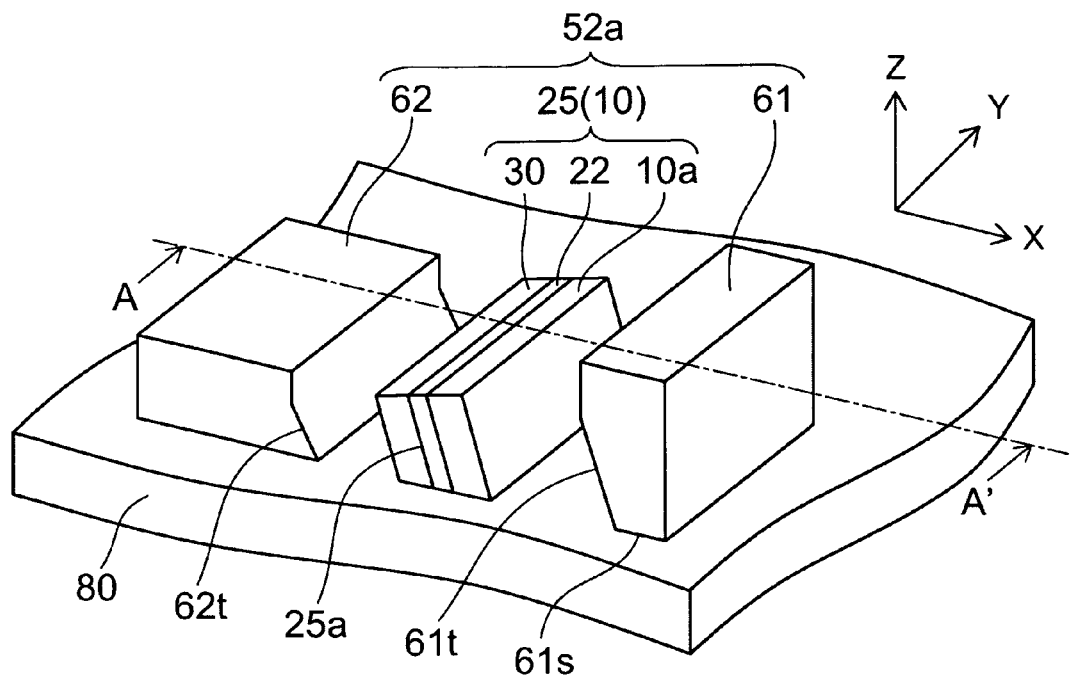
FIGS. 16A and 16B are schematic views illustrating the configuration of another magnetic recording head according to the second embodiment of the invention.
Figure 16B:
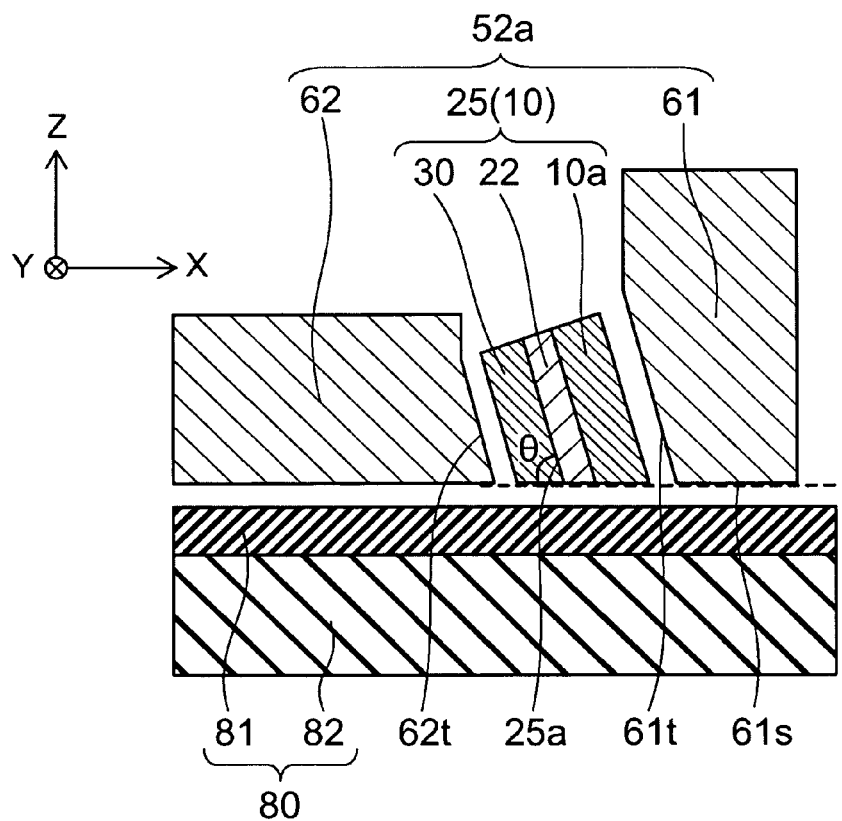

FIGS. 16A and 16B are schematic views illustrating the configuration of another magnetic recording head according to the second embodiment of the invention.

That is, FIG. 16A is a schematic perspective view, and FIG. 16B is a cross-sectional view taken along line A-A' of FIG. 16A.

As shown in FIGS. 16A and 16B, in another magnetic recording head 52a according to the second embodiment of the invention, the surface 61t of the main magnetic pole 61 facing the stacked structure 25 is inclined so as to be along the stacked plane 25a of the stacked structure 25, and furthermore, the surface 62t of the shield 62 facing the spin torque oscillator 10 is similarly inclined.

That is, in the magnetic recording head 52a according to this embodiment, the stacked plane 25a of the stacked structure 25 is inclined with respect to the air bearing surface 61s of the main magnetic pole 61, and the surface 61t of the main magnetic pole 61 facing the stacked structure 25 is approximately parallel to the stacked plane 25a of the stacked structure 25, and the surface 62t of the shield 62 facing the spin torque oscillator 10 is approximately parallel to the stacked plane 25a of the stacked structure 25.

Other than this, the magnetic recording head 52a can be the same as the magnetic recording head 50 according to the first embodiment, and the description thereof will be omitted.

Also, in the magnetic recording head 52a according to this embodiment having such a configuration, the stacked plane 25a of the spin torque oscillator 10 (stacked structure 25) is inclined from the direction perpendicular to the air bearing surface 61s, and therefore, as described in the first embodiment, the intensity of the high-frequency magnetic field applied to the magnetic recording medium is enhanced, and the effect of the high-frequency magnetic field assist is enhanced.

Furthermore, the surface 61t of the main magnetic pole 61 facing the spin torque oscillator 10 and the surface 62t of the shield 62 facing the spin torque oscillator 10 are inclined to be along the inclination of the stacked plane 25a of the spin torque oscillator 10, and therefore, furthermore, stable oscillation can be obtained.

Hereinafter, by using the magnetic recording head 52a illustrated in FIGS. 16A and 16B as an example, a method for manufacturing a magnetic recording head according to this embodiment will be described.

FIGS. 17A to 17D are schematic sectional views by step sequence illustrating the method for manufacturing the magnetic recording head according to the second embodiment of the invention.

Figure 17A:
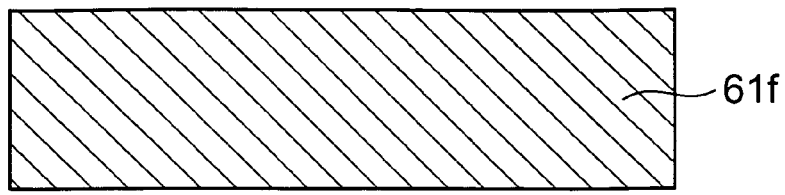
FIGS. 17A to 17D are schematic sectional views by step sequence illustrating the method for manufacturing the magnetic recording head according to the second embodiment of the invention.
Figure 17B:
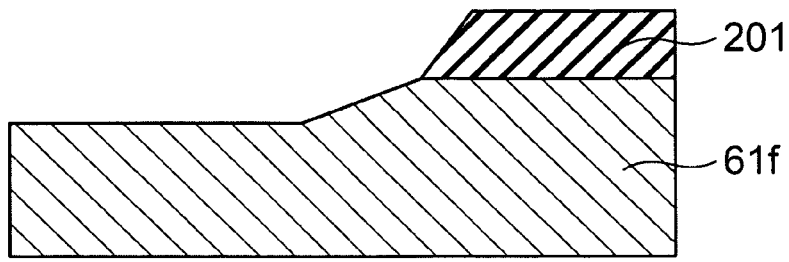
Figure 17C:
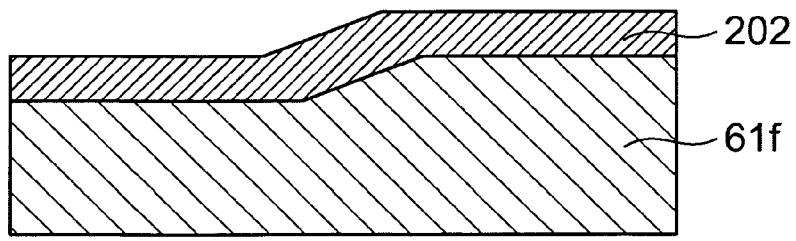
Figure 17D:
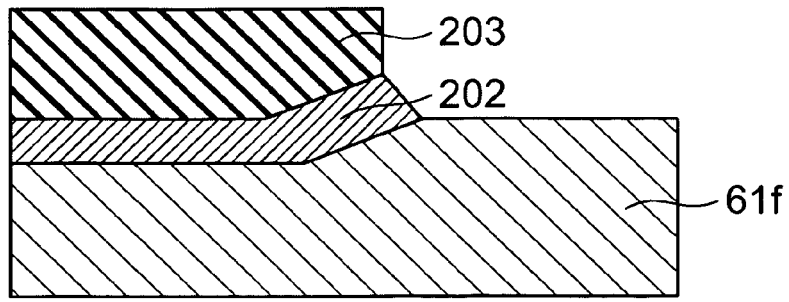

FIG. 17A is a view of the first step, and FIG. 17B is a view following FIG. 17A, and FIG. 17C is a view following FIG. 17B, and FIG. 17D is a view following FIG. 17C.

Figure 18A:
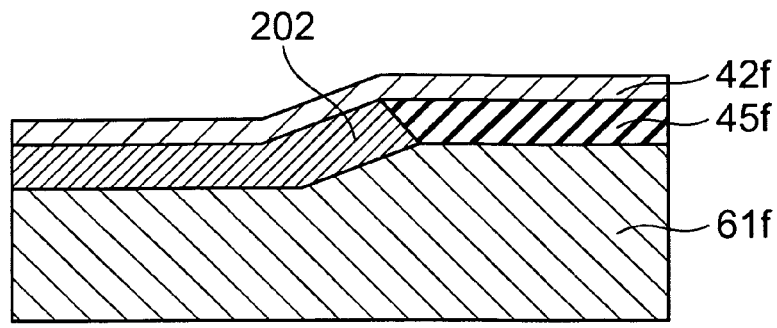
FIGS. 18A to 18C are schematic sectional views by step sequence following FIGS. 17A to 17D.
Figure 18B:
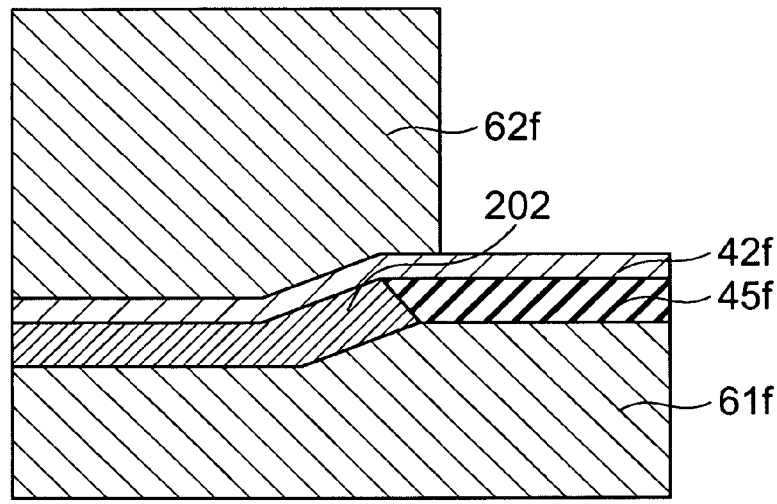
Figure 18C:
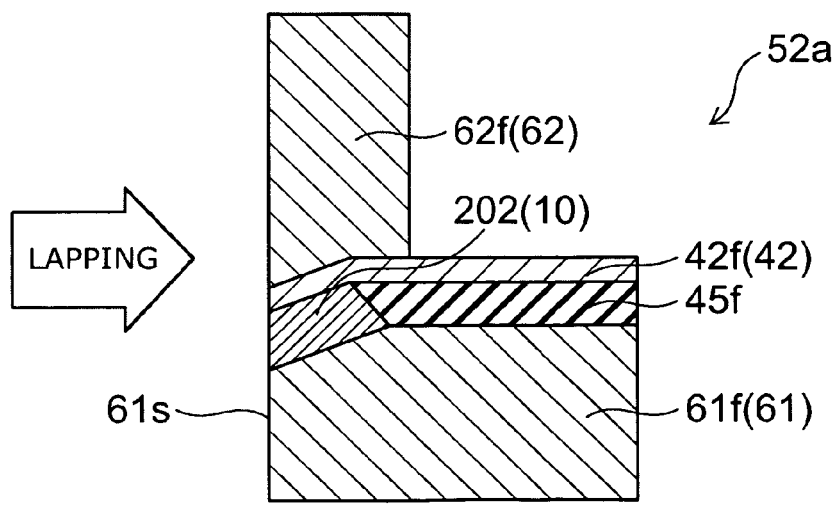

FIGS. 18A to 18C are schematic cross-sectional views by step sequence following FIGS. 17A to 17D.

As shown in FIG. 17A, in the method for manufacturing the magnetic recording head according to this embodiment, first, for example, a FeCo alloy film 61f to be the main magnetic pole 61 is film-formed.

Next, as shown in FIG. 17B, on the FeCo alloy film 61f, a resist 201 is formed by a photolithography process, and the FeCo alloy film 61f is patterned by ion milling. In this case, as shown in FIG. 17B, the patterning is performed so that a taper part is formed on the FeCo alloy film 61f.

Next, as shown in FIG. 17C, a stacked film 202 to be the spin torque oscillator 10 is film-formed to be along the taper part of the FeCo alloy film 61f. For the stacked film 202, for example, a stacked film of a Ta/Ru film to be the ground layer, a CoFe film to be the oscillation layer 10a, a Cu film to be the intermediate layer 22, a CoPt film to be the spin injection layer 30, and a Ta film to be a cap layer can be used. In this specific example, the main magnetic pole 61 has also a function of the lower electrode (first electrode 41).

Next, as shown in FIG. 17D, on the stacked film 202, a resist 203 is formed by a photolithography process, and then the stacked film 202 is patterned by ion milling.

Next, as shown in FIG. 18A, after alumina of the insulator film 45f is film-formed with leaving the resist 203, the insulator film 45f on the resist 203 is removed by lift-off. Then, for example, a Ta film 42f to be the upper electrode (such as the second electrode 42) is film-formed.

Next, as shown in FIG. 18B, for example, a FeCo alloy film 62f to be the shield 62 is film-formed, and a resist is formed by a photolithography process and the FeCo alloy film 62f is patterned by ion milling.

And, as shown in FIG. 18C, then, after finishing such steps as forming a coil (not shown) or a pad (not shown) connected to the upper electrode or the like, the configuration is cut to be a bar shape, and the cut plane is lapped. In this case, the cut direction is, for example, a plane perpendicular to the film-formation plane of the FeCo alloy film 61f to be the main magnetic pole 61.

Thereby, the magnetic recording head 52a illustrated in FIGS. 16A and 16B can be obtained.

In the magnetic recording head 52a obtained as described above, by providing the taper part on, for example, the FeCo alloy film 61f to be the main magnetic pole 61, the stacked plane 25a of the stacked structure 25 of the spin torque oscillator 10 can be inclined with respect to the air bearing surface 61s of the main magnetic pole 61, and the intensity of the high-frequency magnetic field applied to the magnetic recording medium can be enhanced, and the magnetic recording head by which high recording density is realized can be provided.

Third Embodiment

Figure 19A:
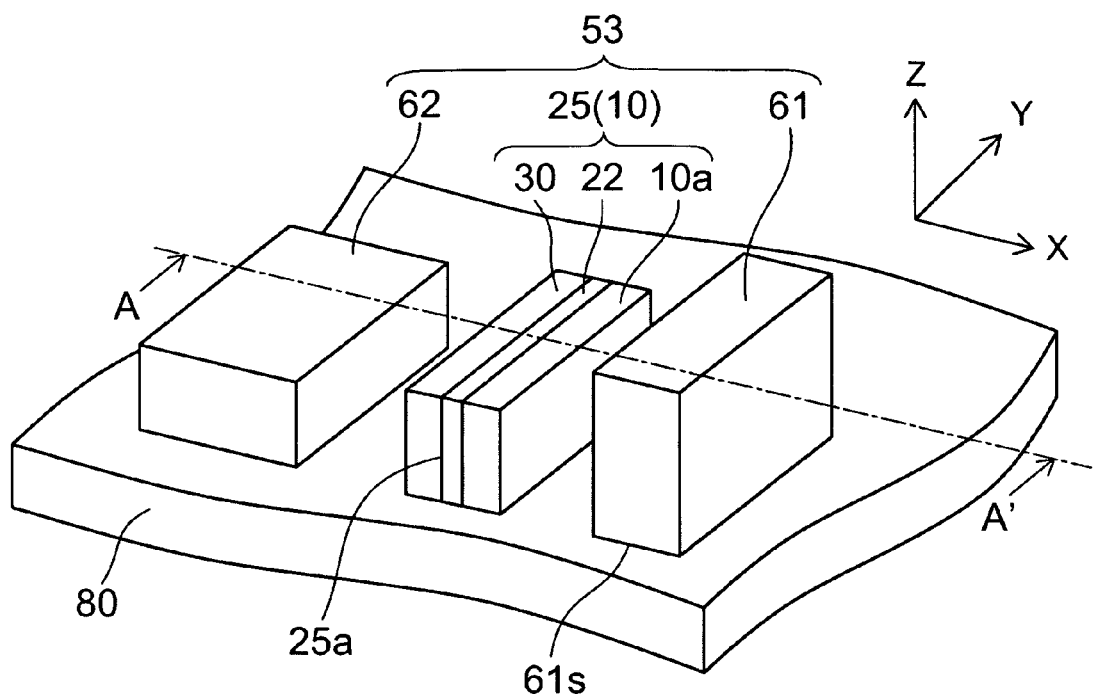
FIGS. 19A and 19B are schematic views illustrating the configuration of the magnetic recording head according to the third embodiment of the invention.
Figure 19B:
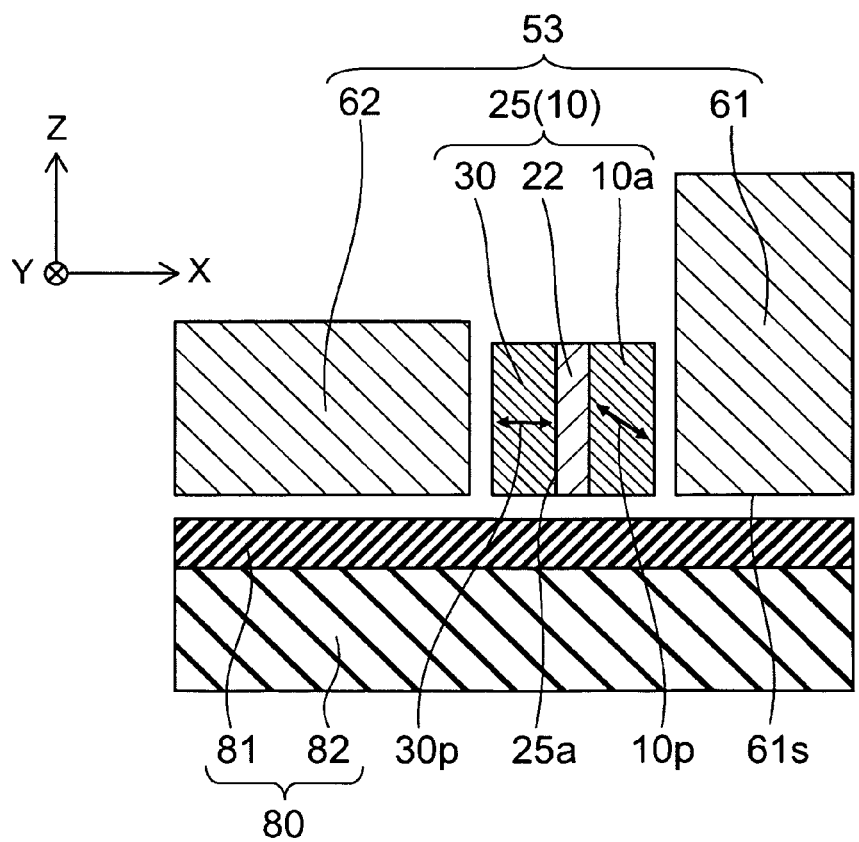

FIGS. 19A and 19B are schematic views illustrating the configuration of the magnetic recording head according to the third embodiment of the invention.

That is, FIG. 19A is a schematic perspective view, and FIG. 19B is a cross-sectional view taken along line A-A' of FIG. 19A.

As shown in FIGS. 19A and 19B, the magnetic recording head 53 according to the third embodiment of the invention includes, the main magnetic pole 61 having the air bearing surface 61s facing the magnetic recording medium, and the stacked structure 25 having the oscillation layer 10a, the spin injection layer 30, and the intermediate layer 22 provided between the oscillation layer 10a and the spin injection layer 30. The orientation axis 10p of the oscillation layer 10a is inclined with respect to the air bearing surface 61s. In the specific example illustrated in FIGS. 19A and 19B, the orientation axis 10p of the oscillation layer 10a is inclined with respect to the air bearing surface 61s. However, furthermore, the orientation axis 30p of the spin injection layer 30 may be inclined with respect to the air bearing surface 61s.

In this specific example, the stacked plane 25a of the stacked structure 25 is perpendicular to the air bearing surface 61s and is not inclined.

Other than this, the magnetic recording head 53 can be the same as the magnetic recording head 50 according to the first embodiment, and therefore, the description thereof will be omitted.

In the magnetic recording head 53 according to this embodiment, because the orientation axis 10p of the oscillation layer 10a is inclined with respect to the air bearing surface 61s, the generated high-frequency magnetic field Hac becomes the circularly polarized magnetic field. Therefore, by the same effect as described in the first embodiment, the intensity of the high-frequency magnetic field applied to the magnetic recording medium 80 can be enhanced, and the magnetic recording head by which high recording density is realized can be provided.

Hereinafter, by using the magnetic recording head 53 illustrated in FIGS. 19A and 19B as an example, a method for manufacturing a magnetic recording head according to this embodiment will be described.

FIGS. 20A to 20D are schematic cross-sectional views by step sequence illustrating the method for manufacturing the magnetic recording head according to the third embodiment of the invention.

Figure 20A:
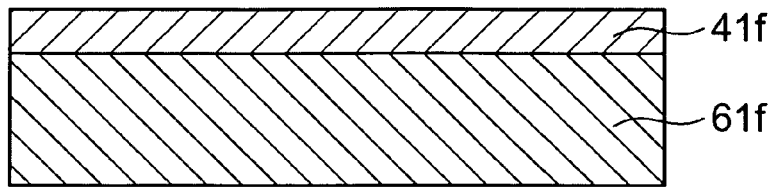
FIGS. 20A to 20D are schematic sectional views by step sequence illustrating the method for manufacturing the magnetic recording head according to the third embodiment of the invention.
Figure 20B:
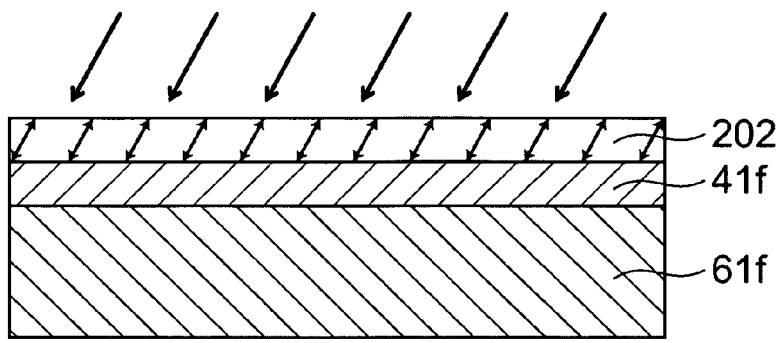
Figure 20C:
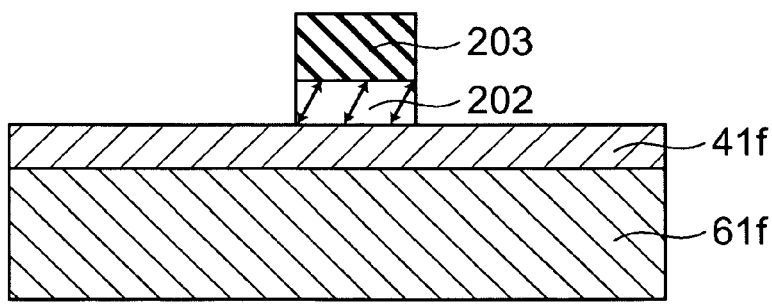
Figure 20D:
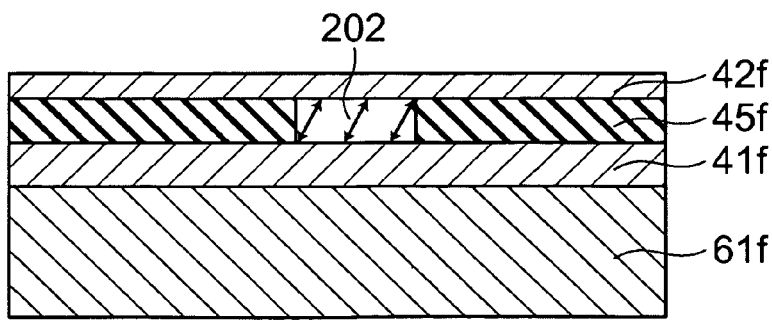

FIG. 20A is a view of the first step, and FIG. 20B is a view following FIG. 20A, and FIG. 20C is a view following FIG. 20B, and FIG. 20D is a view following FIG. 20C.

Figure 21A:
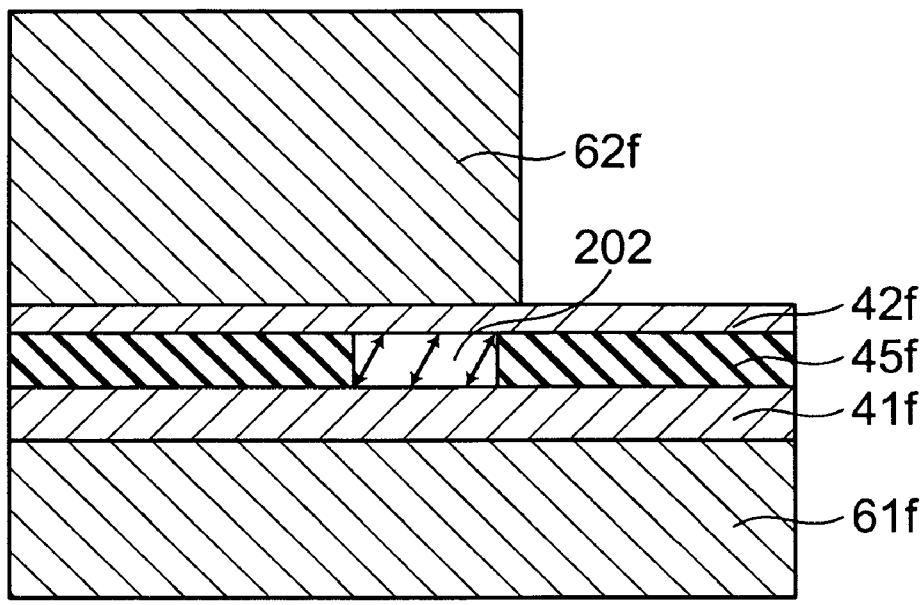
FIGS. 21A and 21B are schematic sectional views by step sequence following FIGS. 20A to 20D.
Figure 21B:
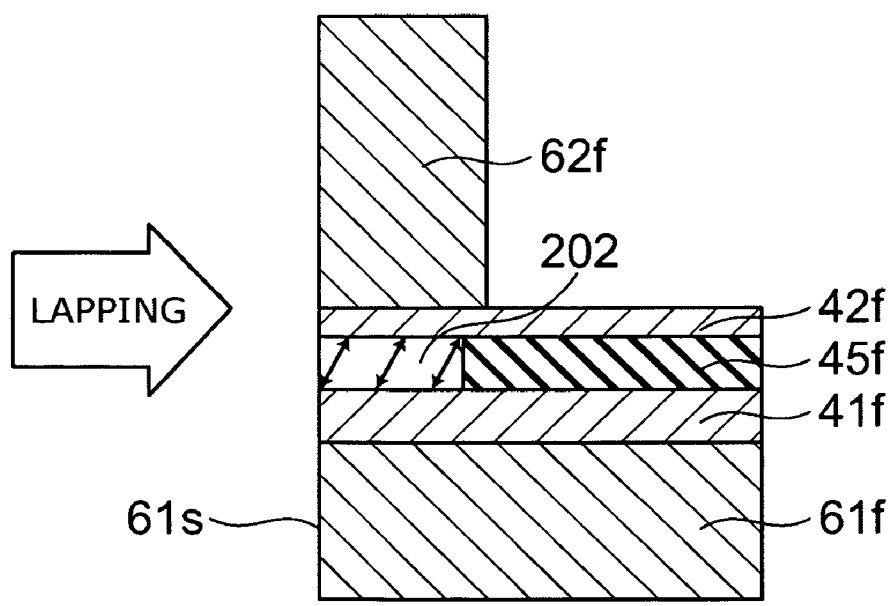

FIGS. 21A and 21B are schematic sectional views by step sequence following FIGS. 20A to 20D.

As shown in FIG. 20A, in the method for manufacturing the magnetic recording head according to this embodiment, first, for example, a FeCo alloy film 61f to be the main magnetic pole 61 and, for example, a Ta film 41f to be the lower electrode (such as the first electrode 41) are film-formed on a substrate (not shown).

Next, as shown in FIG. 20B, on the Ta film 41f, a stacked film 202 to be the spin torque oscillator 10 is film-formed. For the stacked film 202, for example, a stacked film of a Ta/Ru film to be the ground layer, a CoFe film to be the oscillation layer 10a, a Cu film to be the intermediate layer 22, a CoPt film to be the spin injection layer 30, and a Ta film to be a cap layer can be used. And, in order that the orientation axis, namely, the axis of crystal grows diagonally when the CoFe film to be the oscillation layer 10a is film-formed, the film formation is performed so that grains of the material to be film-formed fly diagonally to the main surface of the substrate. Specifically, a film-forming method with high directivity such as an ion beam sputtering method is used and the substrate is inclined, and thereby, the film formation is performed so that the axis of crystal of the CoFe film is diagonal. The film formation may be performed so that the orientation axis of each of the above Ta/Ru film, the CoFe film, the Cu film, the CoPt film, and the Ta film is diagonal.

Next, as shown in FIG. 20C, on the stacked film 202, a resist 203 is formed by a photolithography process, and then the stacked film 202 is patterned by ion milling.

Next, as shown in FIG. 20D, after alumina of the insulator film 45f is film-formed with leaving the resist 203, the insulator film 45f on the resist 203 is removed by lift-off. Then, for example, a Ta film 42f to be the upper electrode (such as the second electrode 42) is film-formed, and the surface of the Ta film 42f is flattened by CMP.

Next, as shown in FIG. 21A, for example, a FeCo alloy film 62f to be the shield 62 is film-formed, and a resist is formed by a photolithography process and the FeCo alloy film 62f is patterned by ion milling.

Next, as shown in FIG. 21B, then, after finishing such steps as forming a coil (not shown) or a pad (not shown) connected to the lower and upper electrodes or the like, the configuration is cut to be a bar shape, and the cut plane is lapped. In this case, the cut direction is, for example, a plane perpendicular to the film-formation plane of the FeCo alloy film 61f to be the main magnetic pole 61.

Thereby, the magnetic recording head 53 illustrated in FIGS. 19A and 19B can be obtained.

In the magnetic recording head 53 obtained as described above, by film-forming the film to be the oscillation layer 10a so that the orientation axis 10p is inclined, the orientation axis 10p of the oscillation layer 10a can be inclined with respect to the air bearing surface 61s of the main magnetic pole 61, and the intensity of the high-frequency magnetic field applied to the magnetic recording medium can be enhanced, and the magnetic recording head by which high recording density is realized can be provided.

In the above specific example, the stacked plane 25a of the stacked structure 25 is perpendicular to the air bearing surface 61s and is not inclined. However, with the orientation axis 10p of the oscillation layer 10a being inclined with respect to the air bearing surface 61s, the stacked plane 25a of the stacked structure 25 may be inclined with respect to the air bearing surface 61s. That is, the first embodiment and this embodiment can also be combined and carried out.

In the magnetic recording head according to this embodiment, as illustrated in FIGS. 8A to 11B, the dispositions of the main magnetic pole 61, the spin torque oscillator 10, and the shield 62 are optional. The stacking order of the oscillation layer 10a, the intermediate layer 22, and the spin injection layer 30 in the spin torque oscillator 10 is optional.

Fourth Embodiment

Figure 22:
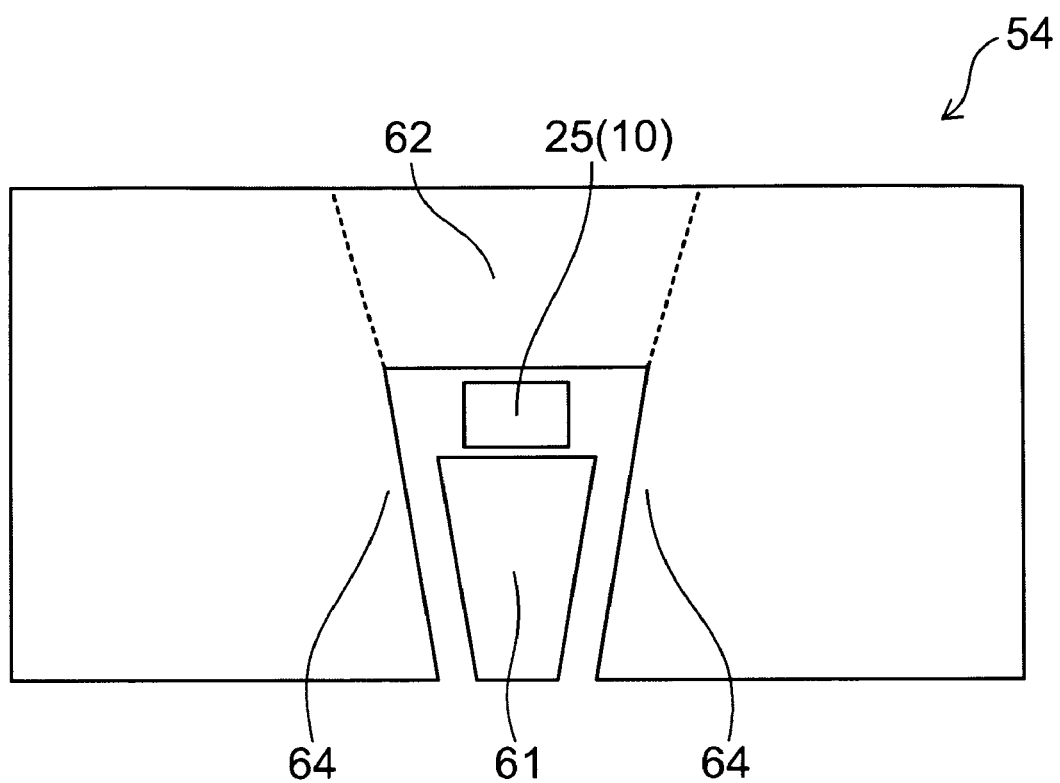
FIG. 22 is a schematic plan view illustrating the configuration of the magnetic recording head according to the fourth embodiment of the invention.

FIG. 22 is a schematic plan view illustrating the configuration of the magnetic recording head according to the fourth embodiment of the invention.

That is, FIG. 22 is a plan view seen from the side of the air bearing surface 61s of the magnetic recording head.

As shown in FIG. 22, the magnetic recording head 54 according to the fourth embodiment of the invention further includes side shields 64 provided so as to face the side surfaces 25r of the stacked structure 25. And, the configuration other than this can be the same as the magnetic recording heads described in the first to third embodiments described previously. That is, in any one of various magnetic recording heads described in the above embodiments, the side shields 64 are provided.

In this specific example, the side shields 64 have a shape of being integrated with the shield 62. However, the side shields 64 may be provided separately from the shield 62.

And, the distance between the main magnetic pole 61 and the side shield 64 is shorter than the distance between the main magnetic pole 61 and the shield 62.

In general, in the case of the structure having the shield 62 (shielded structure), the magnetic field in the recording gap of the magnetic recording head becomes very strong. Therefore, the bias magnetic field acting on the spin torque oscillator 10 also occasionally becomes too strong. Accordingly, when the side shields 64 are provided and the interval between at least one of the side shields 64 and the main magnetic pole 61 is set to narrower than the interval between the main magnetic pole 61 and the shield 62, a larger amount of the magnetic field generated in the main magnetic pole 61 flows to the side of the side shield 64, and therefore, the bias magnetic field applied to the spin torque oscillator 10 can be adjusted to an appropriate magnitude.

According to the magnetic recording head 54 according to this embodiment, the bias magnetic field applied to the spin torque oscillator 10 is adjusted to an appropriate magnitude and made to more stably oscillate, and the intensity of the high-frequency magnetic field applied to the magnetic recording medium can be enhanced, and the magnetic recording head by which high recording density is realized can be provided.

Fifth Embodiment

The magnetic recording head according to a fifth embodiment of the invention is composed so that coercivities of the oscillation layer 10*a* and the spin injection layer 30 are smaller than the magnetic field applied by the main magnetic pole 61. Other than this, this magnetic recording head can be the same as the various magnetic recording heads described in the above first to fourth embodiments of the invention. That is, the magnetic recording head of this embodiment is composed so that the coercivities of the oscillation layer 10*a* and the spin injection layer 30 are smaller than the magnetic field applied by the main magnetic pole 61 in any one of the magnetic recording heads described in the first to fourth embodiments.

Figure 23A:
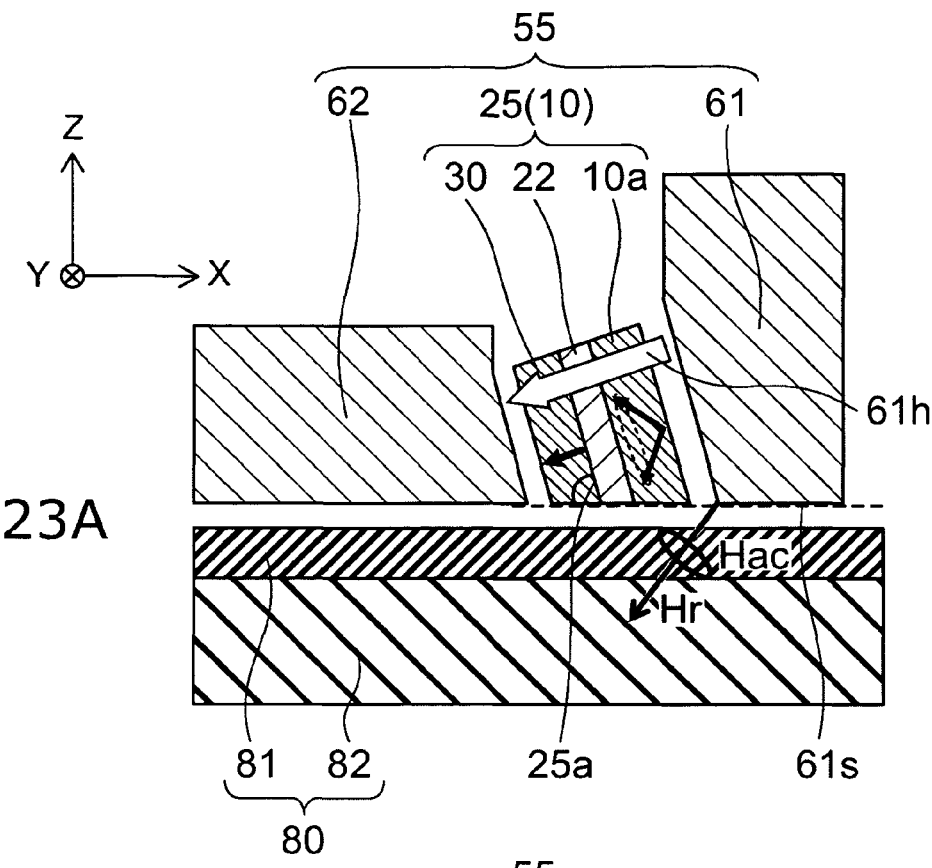
FIGS. 23A and 23B are schematic sectional views illustrating an operation of the magnetic recording head according to a fifth embodiment of the invention.
Figure 23B:
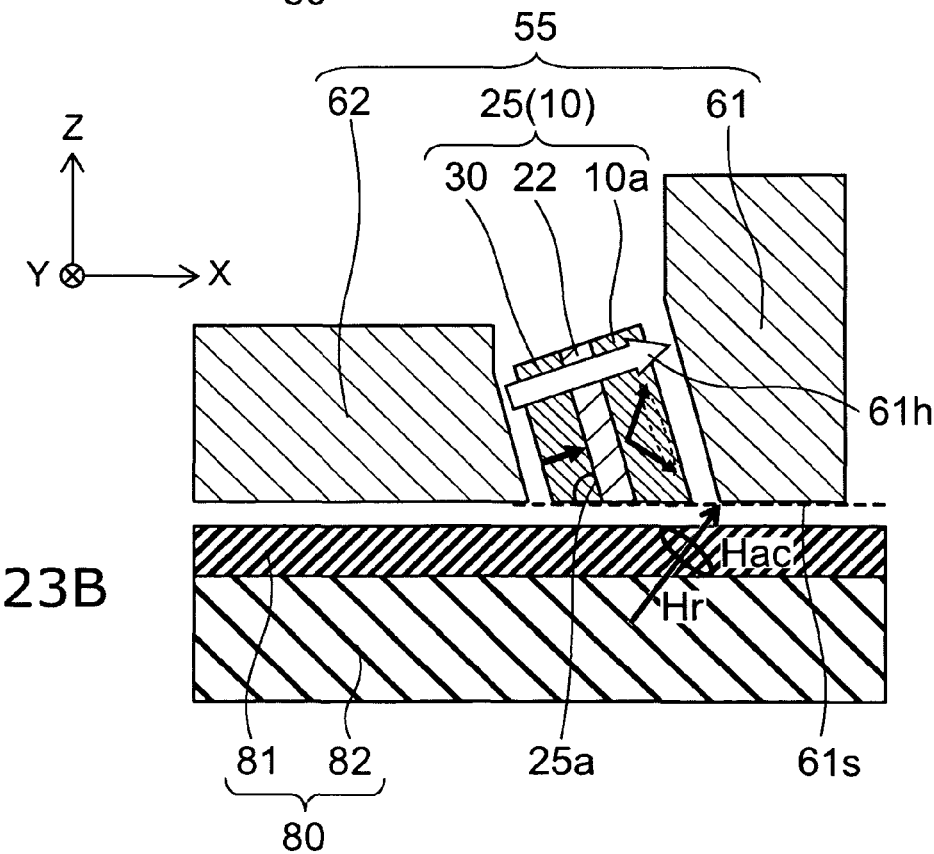

FIGS. 23A and 23B are schematic cross-sectional views illustrating an operation of the magnetic recording head according to a fifth embodiment of the invention.

Namely, FIG. 23A illustrates the case that the magnetic field from the main magnetic pole 61 is in the positive direction, and FIG. 23B illustrates the case that the magnetic field from the main magnetic pole 61 is in the negative direction. Here, the direction of magnetizing the magnetic recording medium 80 downward in the drawing is set to be the positive direction, and the direction of magnetizing the magnetic recording medium 80 upward in the drawing is set to be the negative direction.

FIGS. 23A and 23B illustrates as an example the case that the coercivities of the oscillation layer 10*a* and the spin injection layer 30 become smaller than the magnetic field applied by the main magnetic pole 61 in the magnetic recording head 52*a* illustrated in FIGS. 16A and 16B.

The magnetic recording head 55 according to this embodiment is composed so that coercivities of the oscillation layer 10*a* and the spin injection layer 30 are smaller than the magnetic field applied by the main magnetic pole 61.

Therefore, as shown in FIG. 23A, in the case that the magnetic field 61*h* from the main magnetic pole 61 is in the positive direction, the magnetization of the spin torque oscillator 10 operates toward the direction from the main magnetic pole 61 to the shield 62. And, as shown in FIG. 23B, in the case that the magnetic field 61*h* from the main magnetic pole 61 is in the negative direction, the magnetization of the spin torque oscillator 10 operates toward the direction from the shield 62 to the main magnetic pole 61.

Thereby, in either case that the magnetic field from the main magnetic pole 61 is in the positive or negative direction, the spin torque oscillator 10 can be operated to stably oscillate.

According to the magnetic recording head 55 according to this embodiment, the spin torque oscillator 10 can be made to further stably oscillate, and the intensity of the high-frequency magnetic field applied to the magnetic recording medium can be enhanced, and the magnetic recording head by which high recording density is realized can be provided.

Sixth Embodiment

The magnetic recording head according to a sixth embodiment of the invention will be described with presuming the case of performing recording on a multiparticle medium for perpendicular magnetic recording medium.

Figure 24:
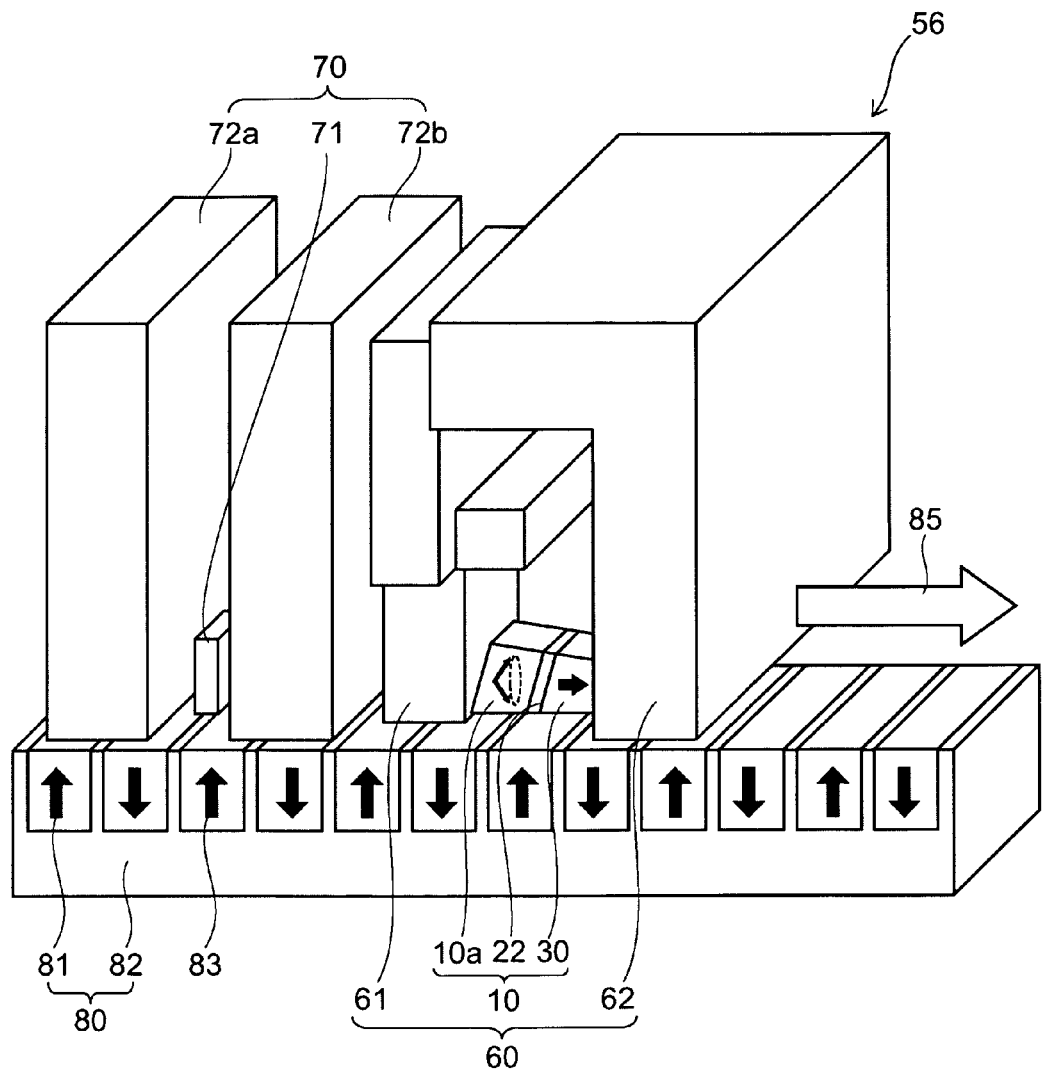
FIG. 24 is a schematic perspective view illustrating the configuration of the magnetic recording head according to the sixth embodiment of the invention.

FIG. 24 is a schematic perspective view illustrating the configuration of the magnetic recording head according to the sixth embodiment of the invention.

Figure 25:
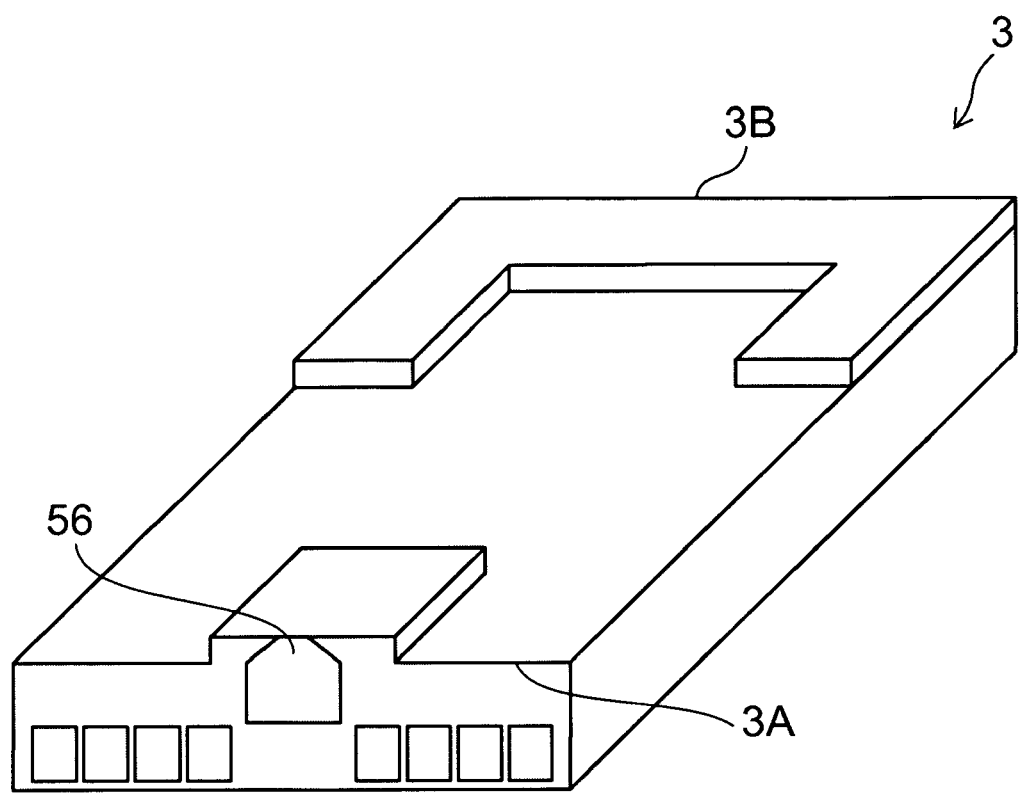
FIG. 25 is a schematic perspective view illustrating a configuration of the head slider on which the magnetic recording head according to an embodiment of the invention is mounted.

FIG. 25 is a schematic perspective view illustrating the configuration of the head slider on which the magnetic recording head according to an embodiment of the invention is mounted.

As shown in FIG. 24, the magnetic recording head 56 according to the sixth embodiment of the invention further includes a reading head section (reproducing head section) 70 disposed in parallel with the main magnetic pole 61.

In the magnetic recording head 56 according to this embodiment, the main magnetic pole 61 and the spin torque oscillator 10 are included in a writing head section 60. Furthermore, the writing head section 60 can further include the shield 62.

The reproducing head section 70 includes a first magnetic shield layer 72*a*, a second magnetic shield layer 72*b*, a magnetic reproducing element 71 provided between the first magnetic shield layer 72*a* and the second magnetic shield layer 72*b*.

Components of the above reproducing head section 70 and components of the above writing head section 60 are separated by an insulator such as alumina, which is not shown.

As the magnetic reproducing element 71, GMR element or TMR (Tunnel Magneto-Resistive effect) element or the like can be utilized. For enhancing the reproducing resolution, the magnetic reproducing element 71 is disposed between the two magnetic shield layers, namely, the first and second magnetic shield layers 72*a* and 72*b*.

And, as shown in FIG. 24, the magnetic recording medium 80 is disposed to face the air bearing surface 61*s* of the magnetic recording head 56. And, the main magnetic pole 61 applies recording magnetic field to the magnetic recording medium 80. The air bearing surface 61*s* of the magnetic recording head 56 can be the main surface of the main magnetic pole 61 facing the magnetic recording medium 80 disposed to the magnetic recording head 56.

For example, as shown in FIG. 25, the magnetic recording head 56 is mounted on the head slider 3. The head slider 3 is made of $Al_2O_3$/TiC or the like, and designed and manufactured so as to be capable of relatively moving with floating on or contacting the magnetic recording medium 80 such as a magnetic disk.

The head slider 3 has an air inflow side 3A and an air outflow side 3B, and the magnetic recording head 56 is disposed on a side surface or the like of the air outflow side 3B. Thereby, the magnetic recording head 56 mounted on the head slider 3 relatively moves with floating on or contacting the magnetic recording medium 80.

At least any one of the magnetic recording heads according to the first to sixth embodiments can be mounted on the head slider 3 illustrated in FIG. 25.

As shown in FIG. 24, the magnetic recording medium 80 has a medium substrate 82 and magnetic recording layers 81 provided thereon. By the magnetic field applied by the writing head section 60, the magnetization 83 of the magnetic recording layer 81 is controlled to be in a predetermined direction, and thereby, writing is performed. In this case, the magnetic recording medium 80 relatively moves in the direction of the medium moving direction 85 with respect to the magnetic recording head 56.

On the other hand, the reproducing head section 70 reads the direction of the magnetization of the magnetic recording layer 81.

For the main magnetic pole 61 and the shield (return path) 62, a soft magnetic layer having a relatively large saturation magnetic flux density such as FeCo, CoFe, CoNiFe, NiFe, CoZrNb, FeN, FeSi, or FeAlSi can be used.

In the main magnetic pole 61, the materials of the part of the side of the air bearing surface 61s and the part except therefor may be different materials. That is, for example, for enhancing the magnetic field generated in the magnetic recording medium 80 or the spin torque oscillator 10, the material of the part of the side of the air bearing surface 61s may be set to be FeCo, CoNiFe, FeN or the like having particularly large saturation magnetic flux density, and the material of the part except therefor may be set to be NiFe or the like having particularly high magnetic permeability. For enhancing the magnetic field generated in the magnetic recording medium 80 or the spin torque oscillator 10, the shape of the main magnetic pole 61 on the side of the air bearing surface 61s may be smaller than the back gap portion. Thereby, the magnetic flux concentrates on the part of the side of the air bearing surface 61s, and the magnetic field of high intensity can be generated.

According to the magnetic recording head 56 according to this embodiment having such a configuration, the intensity of the high-frequency magnetic field applied to the magnetic recording medium can be enhanced, and the magnetic recording head by which high recording density is realized can be provided.

The maximum region of the intensity of the high-frequency magnetic field Hac of the spin torque oscillator 10 exists on the reading side and the trailing side of the oscillation layer 10a. By adjusting the positions of the spin torque oscillator 10 and the main magnetic pole 61 and the shield 62 so that the maximum region of recording magnetic field from the main magnetic pole 61 superposes on the maximum region of the intensity of the high-frequency magnetic field Hac on the trailing side, favorable recording is possible.

In the magnetic recording head 56 according to this embodiment, as the spin torque oscillator (stacked structure), various configurations described in the first to fifth embodiments can be adopted.

Seventh Embodiment

Hereinafter, the magnetic recording apparatus and the magnetic head assembly according to a seventh embodiment of the invention will be described.

The magnetic recording head according to the embodiment of the invention described in the above description can be incorporated into, for example, a magnetic head assembly of an integrated type of recording and reproducing, and can be mounted on a magnetic recording apparatus. The magnetic recording apparatus according to this embodiment can have only the recording function, and can have both of the recording function and the reproducing function.

Figure 26:
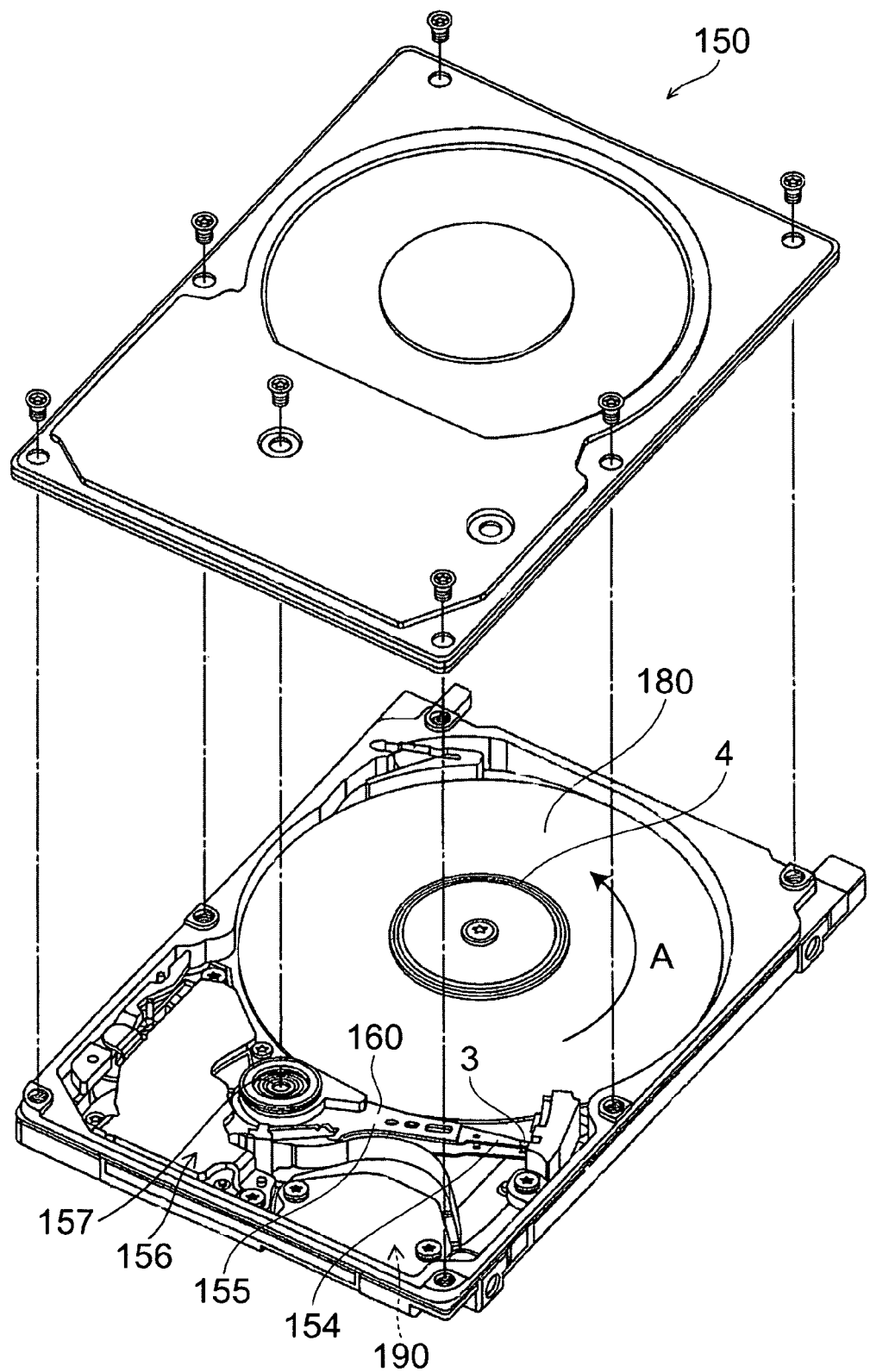
FIG. 26 is a schematic perspective view illustrating the configuration of the magnetic recording apparatus according to a seventh embodiment of the invention.

FIG. 26 is a schematic perspective view illustrating the configuration of the magnetic recording apparatus according to a seventh embodiment of the invention.

Figure 27A:
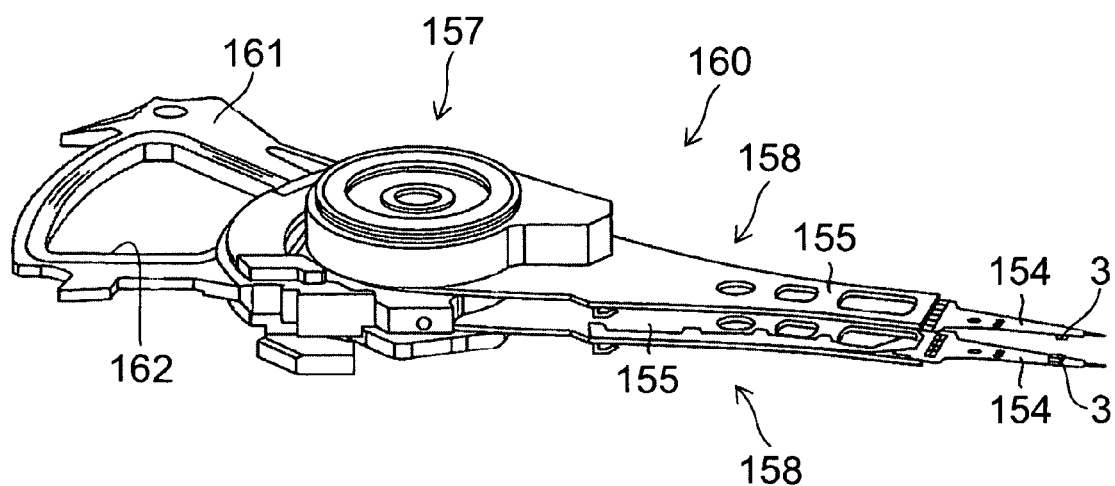
FIGS. 27A and 27B are schematic perspective views illustrating the configuration of part of the magnetic recording apparatus according to the seventh embodiment of the invention.
Figure 27B:
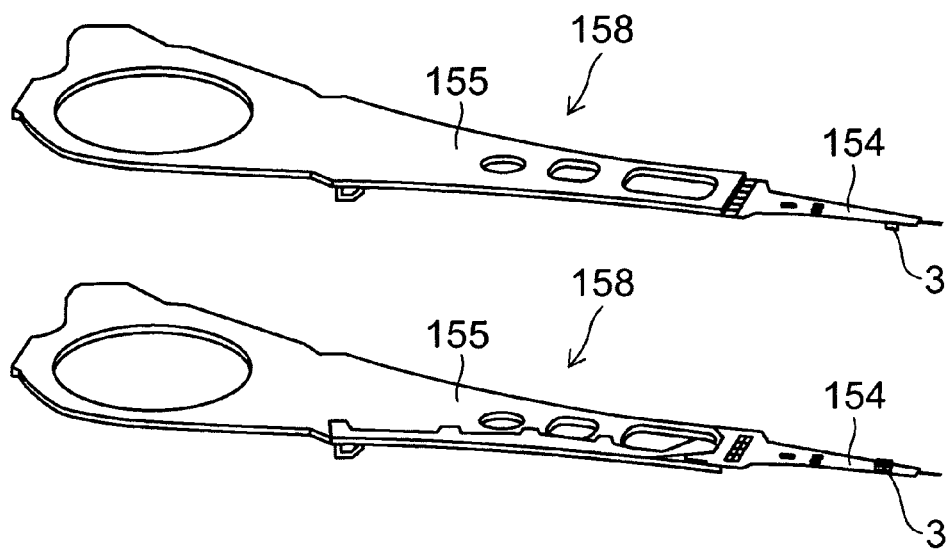

FIGS. 27A and 27B are schematic perspective views illustrating the configuration of part of the magnetic recording apparatus according to the seventh embodiment of the invention.

As shown in FIG. 26, the magnetic recording apparatus 150 according to the seventh embodiment of the invention is an apparatus of a type in which a rotary actuator is used. In FIG. 26, a recording medium disk 180 is loaded on a spindle motor 4, and rotates in the direction of the arrow A by a motor, which is not shown, responding to a control signal from a driving device controller, which is not shown. The magnetic recording apparatus 150 according to this embodiment may have a plurality of the recording medium disks 180.

The head slider 3 for performing recording and reproducing of information to be stored in the recording medium disk 180 has such a configuration as described previously and is attached to an end of a thin-film suspension 154. Here, the head slider 3 mounts, for example, the magnetic recording head according to any one of the above embodiments in the vicinity of the end thereof.

When the recording medium disk 180 rotates, the compression pressure by the suspension 154 and the pressure generated in the air bearing surface (ABS) of the head slider 3 are balanced, and the air bearing surface of the head slider 3 is held with a predetermined floatation amount from the surface of the recording medium disk 180. So-called "contact traveling type" in which the head slider 3 contacts the recording medium disk 180 is also possible.

The suspension 154 is connected to one end of an actuator arm 155 having a bobbin for holding a driving coil, which is not shown. In the other end of the actuator arm 155, a voice coil motor 156 that is one kind of linear motors is provided. The voice coil motor 156 can be composed of, a driving coil, which is not shown, rolled up by the bobbin of the actuator arm 155, permanent magnets disposed to be opposed to each other so as to sandwich the coil, and magnetic circuits consisting of opposed yokes.

The actuator arm 155 is held by ball bearings, which is not shown, provided in two places above and below a bearing 157, and can rotate and slide by the voice coil motor 156.

FIG. 27A illustrates the configuration of part of the magnetic recording apparatus according to this embodiment and is an enlarged perspective view of a head stack assembly 160. FIG. 27B is a perspective view illustrating a magnetic head assembly (head gimbal assembly) 158 to be part of the head stack assembly 160.

As shown in FIG. 27A, the head stack assembly 160 has a bearing 157, a head gimbal assembly 158 extending from the bearing 157, and a support frame 161 extending in the opposite direction to the head gimbal assembly 158 from the bearing 157 and supporting a coil 162 of the voice coil motor.

As shown in FIG. 27B, the head gimbal assembly 158 has an actuator arm 155 extending from the bearing 157 and a suspension 154 extending from the actuator arm 155.

To the end of the suspension 154, the head slider 3 having any one of the magnetic recording heads according to the embodiments of the invention described previously is attached. And, as described previously, on the head slider 3, a magnetic recording head according to an embodiment of the invention is mounted.

That is, the magnetic head assembly (head gimbal assembly) 158 according to the embodiment of the invention has the magnetic recording head according to any one of the embodiments of the invention, the head slider 3 on which the magnetic recording head is mounted, the suspension 154 mounting the head slider 3 on one end thereof, and the actuator arm 155 connected to the other end of the suspension 154.

The suspension 154 has lead wires (not show) for writing and reading signals and for heater for adjusting the floatation amount and for the spin torque oscillator, and the lead wires are electrically connected to the electrodes of the magnetic recording head incorporated into the head slider 3. Electrode pad, which is not shown, is provided in the head gimbal assembly 158. In this specific example, eight electrode pads are provided. That is, two electrode pads for the coil of the main magnetic pole 61 and two electrode pads for the magnetic reproducing element 71 and two electrode pads for DFH (dynamic flying height) and two electrode pads for the spin torque oscillator 10 are provided.

And, a signal processor 190 for writing and reading of signals on the magnetic recording medium by using the magnetic recording head is provided. The signal processor 190 is, for example, provided on the back side of the figure of the magnetic recording apparatus 150 illustrated in FIG. 26. The input and output lines of the signal processor 190 are connected to the electrode pads of the head gimbal assembly 158 and electrically bonded to the magnetic recording head.

As described above, the magnetic recording apparatus 150 according to this embodiment has the magnetic recording medium, the magnetic recording head according to the above embodiment, a movable section by which the magnetic recording medium and the magnetic recording head can be relatively moved with opposed to each other in the state of being separated from each other or contacting each other, a position controller of positioning the magnetic recording head to a predetermined recording position on the magnetic recording medium, and the signal processor for writing and reading of signals on the magnetic recording medium by using the magnetic recording head.

That is, as the above magnetic recording medium, the recording medium disk 180 is used.

The above movable section can include the head slider 3.

The above position controller can include the head gimbal assembly 158.

That is, the magnetic recording apparatus 150 according to this embodiment has the magnetic recording medium, the magnetic head assembly according to the embodiment of the invention, and the signal processor for writing and reading of signals on the magnetic recording medium by using the magnetic recording head mounted on the magnetic head assembly.

According to the magnetic recording apparatus 150 according to this embodiment, by using the spin torque oscillator of the above embodiment and the magnetic recording head according to the above embodiment, stable high-frequency magnetic field by the spin torque oscillator by which oscillation can be performed stably by the low current density and in which the intensity of the in-plane high-frequency magnetic field is high can be obtained, and the magnetic recording apparatus by which magnetic recording with high density can be realized can be provided.

In the magnetic recording apparatus according to the embodiment of the invention, the spin torque oscillator 10 can be provided on the trailing side of the main magnetic pole 61. In this case, the magnetic recording layer 81 of the magnetic recording medium 80 is first opposed to the spin torque oscillator 10 and then opposed to the main magnetic pole 61.

In the magnetic recording apparatus according to the embodiment of the invention, the spin torque oscillator 10 can be provided on the reading side of the main magnetic pole 61. In this case, the magnetic recording layer 81 of the magnetic recording medium 80 is first opposed to the main magnetic pole 61 and then opposed to the spin torque oscillator 10.

Hereinafter, the magnetic recording medium that can be used for the magnetic recording apparatus of the above embodiment will be described.

Figure 28A:
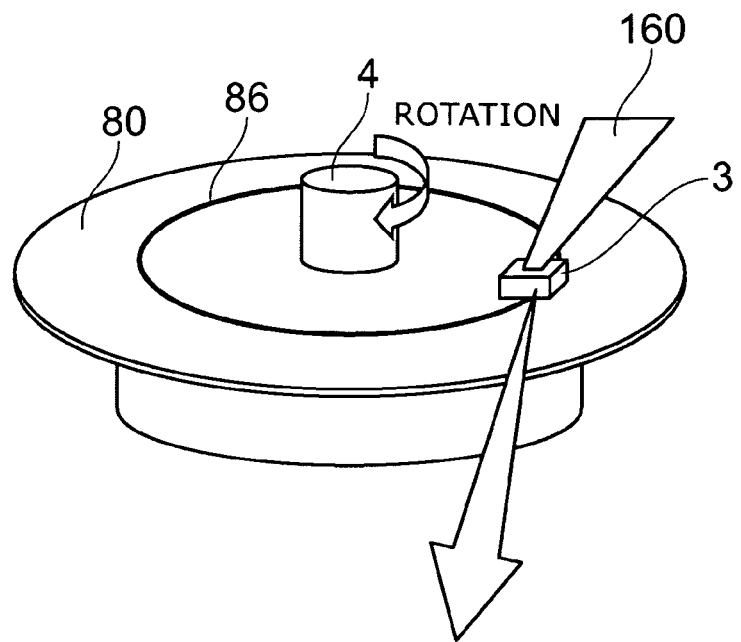
FIGS. 28A and 28B are schematic perspective views illustrating the configuration of the magnetic recording medium of the magnetic recording apparatus according to the embodiment of the invention.
Figure 28B:
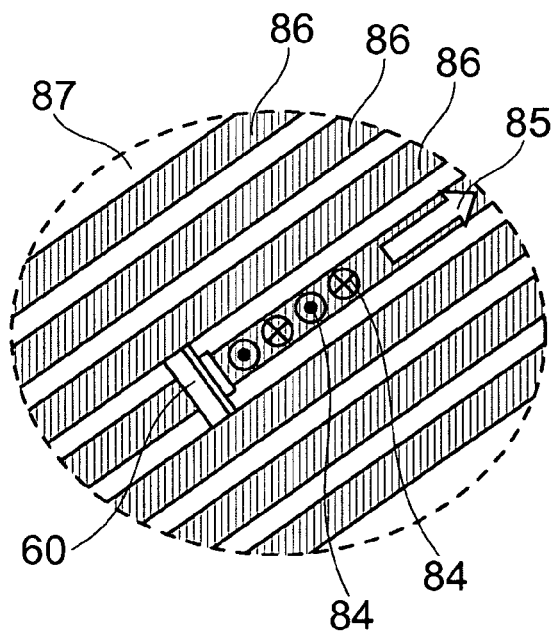

FIGS. 28A and 28B are schematic perspective views illustrating the configuration of the magnetic recording medium of the magnetic recording apparatus according to the embodiment of the invention.

As shown in FIGS. 28A and 28B, the magnetic recording medium 80 used for the magnetic recording apparatus according to the embodiment of the invention has magnetic discrete tracks (recording tracks) 86 of multiparticle that are separated from one another by nonmagnetic material (or air) 87 and oriented perpendicularly. When the magnetic recording medium 80 is rotated by the spindle motor 4 and moves in the medium moving direction 85, the recording magnetization 84 can be formed by any one of the magnetic recording heads of the above embodiments of the invention.

As described above, in the magnetic recording apparatus according to the embodiment of the invention, the magnetic recording medium 80 can be the discrete track medium in which the adjacent recording tracks are formed through a non-magnetic member.

By setting the width (TS) of the recording track width direction of the spin track oscillator 10 to be the width (TW) of the recording track 86 or more and the recording track pitch (TP) or less, coercivity lowering of the adjacent recording tracks by the leaking high-frequency magnetic field generated from the spin torque oscillator 10 can be drastically suppressed. Therefore, in the magnetic recording medium 80 of this specific example, only the recording track 86 to be desired to be recorded can be effectively subjected to microwave assisted magnetic recording.

According to this specific example, compared to the case of using so-called "blanket-film-shaped" multiparticle-based perpendicular medium, it is easy to realize the high-frequency assist recording apparatus with narrow track, namely, high track density. By utilizing the microwave assisted magnetic recording scheme and further by using a medium magnetic material having high magnetic anisotropic energy (Ku) such as FePt or SmCo in which wiring is impossible by a conventional magnetic recording head, the medium magnetic particles can be further finer to the size of nanometers, and the magnetic recording apparatus in which linear recording density is far higher than that of conventional technique in the recording track direction (bit direction) as well can be realized.

According to the magnetic recording apparatus according to this embodiment, in the discrete-type magnetic recording medium 80, recording can be performed certainly to the magnetic recording layer having high coercivity, and high-density and high-speed magnetic recording becomes possible.

Figure 29A:
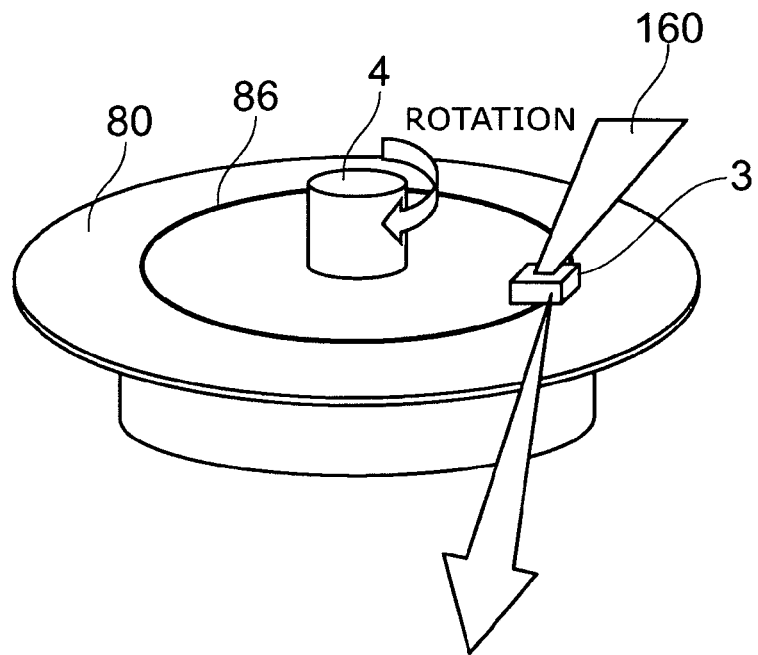
FIGS. 29A and 29B are schematic perspective views illustrating the configuration of another magnetic recording medium of the magnetic recording apparatus according to the embodiment of the invention
Figure 29B:
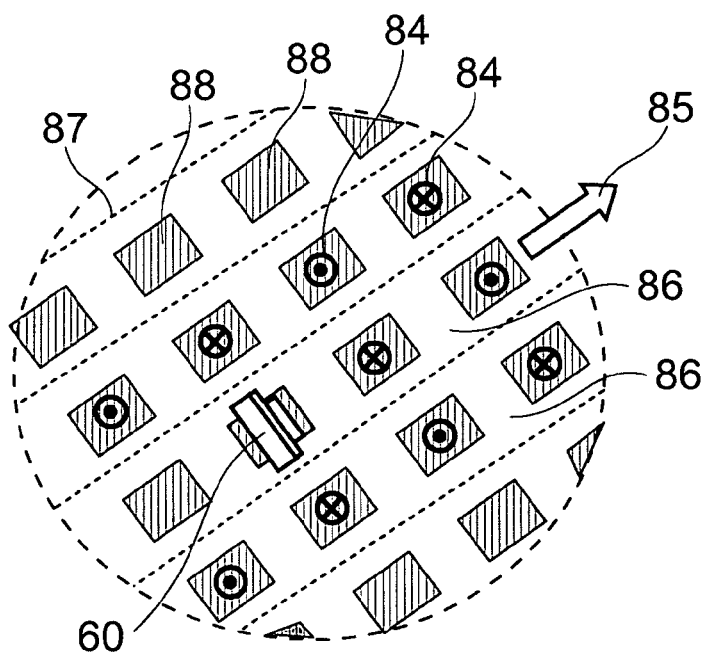

FIGS. 29A and 29B are schematic perspective views illustrating the configuration of another magnetic recording medium of the magnetic recording apparatus according to the embodiment of the invention.

As shown in FIGS. 29A and 29B, in another magnetic recording medium 80 that can be used for the magnetic recording apparatus according to the embodiment of the invention has magnetic discrete bits 88 that are separated from one another by a nonmagnetic material 87. When the magnetic recording medium 80 is rotated by the spindle motor 4 and moves in the medium moving direction 85, the recording magnetization 84 can be formed by the magnetic recording head according to the embodiment of the invention.

As described above, in the magnetic recording apparatus according to the embodiment of the invention, the magnetic recording medium 80 can be the discrete bit medium in which the independent recording magnetic dots are regularly arranged and formed through a non-magnetic member.

According to the magnetic recording apparatus according to this embodiment, in the discrete-type magnetic recording medium 80, recording can be performed certainly to the magnetic recording layer having high coercivity as well, and high-density and high-speed magnetic recording becomes possible.

Also in this specific example, by setting the width (TS) of the recording track width direction of the spin torque oscillator 10 to be the width (TW) of the recording track 86 or more and the recording track pitch (TP) or less, coercivity lowering of the adjacent recording tracks by the leaking high-frequency magnetic field generated from the spin torque oscillator 10 can be drastically suppressed. Therefore, only the recording track 86 to be desired to be recorded can be effectively subjected to microwave assisted magnetic recording. By using this specific example, as long as the resistance to thermal fluctuation under the use environment can be held, by making the magnetic discrete bit 88 have higher magnetic anisotropic energy (Ku) and be finer, there is possibility of realizing the microwave assisted magnetic recording apparatus with high recording density of 10 Tbits/inch$^2$ or more.

As described above, the embodiments of the invention have been described with reference to specific examples. However, the invention is not limited to the specific examples. For example, any specific structures of each of the components composing the magnetic recording head, the magnetic head assembly, and the magnetic recording apparatus are included in the scope of the invention, as long as the specific structures can be carried out similarly by appropriate selection from the known range by those skilled in the art and the same effect can be obtained.

Moreover, combination of two or more components of the respective specific examples in the technically possible range is included in the scope of the invention as long as including the spirit of the invention.

In addition, all of the magnetic recording heads, the magnetic head assemblies, and the magnetic recording apparatuses that can be carried out with appropriately design-modified by those skilled in the art based on the magnetic recording heads, the magnetic head assemblies, and the magnetic recording apparatuses described above as the embodiments of the invention belong to the scope of the invention as long as including the spirit of the invention.

In addition, it is understood that those skilled in the art can achieve various changed examples and modified examples within the spirit of the invention and that the changed examples and the modified examples belong to the scope of the invention.

The invention claimed is:

1. A magnetic head assembly comprising:
   a magnetic writing head including:
      a main magnetic pole having an air bearing surface facing a magnetic recording medium; and
      a stacked structure including a first magnetic layer, a second magnetic layer, and an intermediate layer provided between the first magnetic layer and the second magnetic layer, a stacked plane of the stacked structure being inclined with respect to the air bearing surface;
   a head slider, the magnetic writing head being mounted on the head slider;
   a suspension, the head slider being mounted on one end of the suspension; and
   an actuator arm connected to other end of the suspension.

2. The assembly according to claim 1, wherein a surface of the main magnetic pole facing the stacked structure is approximately parallel to the stacked plane of the stacked structure.

3. The assembly according to claim 1, wherein an angle made by the stacked plane and the air bearing surface is 30 degrees or more and 85 degrees or less.

4. The assembly according to claim 1, the magnetic writing head further including a shield provided on an opposite side to a surface of the stacked structure facing the main magnetic pole.

5. The assembly according to claim 4, the magnetic writing head further including a side shield provided so as to face a side surface of the stacked structure and a distance between the main magnetic pole and the side shield is shorter than a distance between the main magnetic pole and the shield.

6. The assembly according to claim 1, wherein coercivities of the first magnetic layer and the second magnetic layer are smaller than a magnetic field applied by the main magnetic pole.

7. The assembly according to claim 1, wherein the first magnetic layer is disposed between the main magnetic pole and the second magnetic layer.

8. The assembly according to claim 1, wherein the second magnetic layer is disposed between the main magnetic pole and the first magnetic layer.

9. The assembly according to claim 1, further comprising a reading head section disposed together with the main magnetic pole.

10. The assembly according to claim 1, wherein a distance between the stacked plane and the main magnetic pole is longer in a part in which the stacked structure is distant from the air bearing surface than in a part in which the stacked structure is near to the air bearing surface.

11. A magnetic head assembly comprising:
    a magnetic writing head including:
       a main magnetic pole having an air bearing surface facing a magnetic recording medium; and
       a stacked structure including a first magnetic layer, a second magnetic layer, and an intermediate layer provided between the first magnetic layer and the second magnetic layer, an orientation axis of the first magnetic layer being inclined with respect to the air bearing surface;
    a head slider, the magnetic writing head being mounted on the head slider;
    a suspension, the head slider being mounted on one end of the suspension; and
    an actuator arm connected to other end of the suspension.

12. The assembly according to claim 11, the magnetic writing head further including: a shield provided on an opposite side of the stacked structure to a surface facing the main magnetic pole; and a side shield provided so as to face a side surface of the stacked structure, and a distance between the main magnetic pole and the side shield is shorter than a distance between the main magnetic pole and the shield.

13. The assembly according to claim 11, wherein coercivities of the first magnetic layer and the second magnetic layer are smaller than a magnetic field applied by the main magnetic pole.

14. The assembly according to claim 11, wherein the first magnetic layer is disposed between the main magnetic pole and the second magnetic layer.

15. The assembly according to claim 11, wherein the second magnetic layer is disposed between the main magnetic pole and the first magnetic layer.

16. A magnetic recording apparatus comprising:
    a magnetic recording medium;
    a magnetic head assembly including:
       a magnetic writing head including:
          a main magnetic pole having an air bearing surface facing a magnetic recording medium; and
          a stacked structure including a first magnetic layer, a second magnetic layer, and an intermediate layer provided between the first magnetic layer and the second magnetic layer, a stacked plane of the stacked structure being inclined with respect to the air bearing surface;

a head slider, the magnetic writing head being mounted on the head slider;

a suspension, the head slider being mounted on one end of the suspension; and an actuator arm connected to the other end of the suspension; and a signal processor configured to write a signal on the magnetic recording medium by using the magnetic writing head mounted on the head assembly.

17. The apparatus according to claim 16, wherein a spin torque oscillator comprising the stacked structure is provided on a trailing side of the main magnetic pole.

18. The apparatus according to claim 16, wherein a spin torque oscillator comprising the stacked structure is provided on a reading side of the main magnetic pole.

19. The apparatus according to claim 16, wherein the magnetic recording medium is a discrete track medium in which adjacent recording tracks are formed through a nonmagnetic member.

20. The apparatus according to claim 16, wherein the magnetic recording medium is a discrete bit medium in which independent recording magnetic dots are regularly arranged and formed through a nonmagnetic member.

21. A magnetic head assembly comprising:

a magnetic head including a writing head section and a reading head section, the writing head section including:

a main magnetic pole having an air bearing surface for facing a magnetic recording medium; and a stacked structure including a first magnetic layer, a second magnetic layer, and an intermediate layer provided between the first magnetic layer and the second magnetic layer, a normal to the stacking plane of the stacked structure being oblique with respect to plane defined by the air bearing surface;

a head slider on which the writing head section is mounted;

a suspension having a first end on which the head slider is mounted; and an actuator arm connected to a second end of the suspension.

\* \* \* \* \*